United States Patent
Namie

(10) Patent No.: US 10,394,197 B2
(45) Date of Patent: *Aug. 27, 2019

(54) MODEL PREDICTIVE CONTROL DEVICE, CONTROL METHOD OF MODEL PREDICTIVE CONTROL DEVICE, INFORMATION PROCESSING PROGRAM AND RECORDING MEDIUM

(71) Applicant: OMRON Corporation, Kyoto (JP)

(72) Inventor: Masaki Namie, Takatsuki (JP)

(73) Assignee: OMRON Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/439,918

(22) Filed: Feb. 22, 2017

(65) Prior Publication Data

US 2018/0067461 A1 Mar. 8, 2018

(30) Foreign Application Priority Data

Sep. 5, 2016 (JP) .................... 2016-172850

(51) Int. Cl.
*G05B 13/02* (2006.01)
*G05B 13/04* (2006.01)
*G05B 19/404* (2006.01)

(52) U.S. Cl.
CPC ......... *G05B 13/048* (2013.01); *G05B 19/404* (2013.01)

(58) Field of Classification Search
USPC .......................................................... 700/29
See application file for complete search history.

(56) References Cited

U.S. PATENT DOCUMENTS

| 7,418,372 B2 * | 8/2008 | Nishira ............... B60K 31/047 700/44 |
| 2008/0200996 A1 | 8/2008 | Miyamoto et al. |
| 2010/0082120 A1 * | 4/2010 | Stephenson .......... G05B 13/048 700/29 |
| 2015/0346704 A1 * | 12/2015 | Tabaru .................... G06F 17/11 700/29 |
| 2016/0041536 A1 | 2/2016 | Benosman et al. |
| 2016/0048119 A1 * | 2/2016 | Wojsznis ........... G05B 19/0423 700/11 |

(Continued)

FOREIGN PATENT DOCUMENTS

| JP | 2008198064 | 8/2008 |
| JP | 2009193192 | 8/2009 |
| WO | 2015136809 | 9/2015 |

OTHER PUBLICATIONS

Ronald L. Allen et al., "Time-Domain Signal Analysis", Signal Analysis: Time, Frequency, Scale, and Structure, Dec. 19, 2003, pp. 273-382.

(Continued)

*Primary Examiner* — Mohammad Ali
*Assistant Examiner* — Md Azad
(74) *Attorney, Agent, or Firm* — JCIPRNET

(57) ABSTRACT

A controller (10) corrects a predictive value in a certain predictive error variation cycle by using the predictive error in a predictive error variation cycle prior to the certain predictive error variation cycle, wherein the predictive error variation cycle is a cycle of a time change of an error, i.e., predictive error, between an actually measured value and a predictive value of the controlled quantity.

9 Claims, 13 Drawing Sheets

(56) References Cited

U.S. PATENT DOCUMENTS

2016/0170384 A1* 6/2016 Charest-Finn ....... G05B 13/048
                                                    700/44
2016/0357169 A1* 12/2016 Di Cairano .......... G05B 19/106
2017/0235285 A1* 8/2017 Azuma ................ G05B 13/048
                                                    700/29

OTHER PUBLICATIONS

Jangsik Park et al.,"Performance Comparison of Peak Detection Algorithm for Nano-bio Sensors",Proceedings The 7th International Conference on Information Security and Assurance, ASTL vol. 21, Apr. 30, 2013,pp. 290-293.
"Search Report of European Counterpart Application," dated Jan. 8, 2018, p. 1-p. 14, in which the listed references were cited.
"Summons to attend oral proceedings pursuant to Rule 115(1) EPC of European Counterpart Application No. 17157324.9", issued on Dec. 3, 2018, p. 1-p. 10, in which the listed reference was cited.
"Brief Communication for Oral Proceedings of Europe Counterpart Application," dated May 28, 2019, p. 1-p. 12.
"Decision to refuse a European Patent application," dated Jun. 19, 2019, p. 1-p. 25.
"Provision of the minutes in accordance with Rule 124(4) EPC," issued on Jun. 19, 2019, p. 1-p. 7.

\* cited by examiner

MODEL PREDICTIVE CONTROL DEVICE, CONTROL METHOD OF MODEL PREDICTIVE CONTROL DEVICE, INFORMATION PROCESSING PROGRAM AND RECORDING MEDIUM

CROSS-REFERENCE TO RELATED APPLICATION

This application claims the priority benefit of Japan Application no. 2016-172850, filed on Sep. 5, 2016. The entirety of the above-mentioned patent application is hereby incorporated by reference herein and made a part of this specification.

BACKGROUND OF THE INVENTION

1. Field of the Invention

The present invention relates to a model predictive control device using a model of a controlled object to predict a controlled quantity.

2. Description of Related Art

In the past, for example, in processing machinery, there are known various tries for maintaining a control performance when a disturbance such as a vibration excited by acceleration and deceleration of a tool and a table, a shake from other peripheral other machineries, etc., is generated.

For example, the following patent document 1 records a process control device, containing a plug-in disturbance removing controller, which is appended to a feedback ring, and is designed by using an internal model principle, and a disturbance on the feedback ring is removed by using a measured value of a controlled object.

EXISTING TECHNICAL DOCUMENTS

Patent Document

Patent document 1: JP No. 2008-198064 gazette (published on 28 Aug. 2008)

However, a model pattern of a disturbance generator must be prepared for the traditional technology as mentioned above in advance. Generally speaking, modeling of the disturbance is harder than that of the controlled object, therefore, the traditional technology as mentioned above has the following problem, i.e., a high model manufacturing capacity is required. Besides, applicable machineries and devices are limited.

SUMMARY OF THE INVENTION

The present invention provides a model predictive control device which can more simply suitable for disturbance compensation specific to machineries and devices in a broad range without the need of a disturbance model.

In order to solve the problem, a model predictive control device in a form of the present invention uses a model of a controlled object to predict a controlled quantity of the controlled object corresponding to a command value generated in each control cycle according to a target trajectory, the model predictive control device is characterized by comprising: a judging part, judging whether cyclicity exists specific to a time change of a model predictive error, wherein the model predictive error is an error between an actually measured value of the controlled quantity of the controlled object and a predictive value of the controlled quantity predicted by using the model; and a predictive value correcting part, correcting the predictive value of the controlled quantity predicted by using the model in a certain predictive error variation cycle by using the model predictive error in a predictive error variation cycle prior to the certain predictive error variation cycle when the judging part judges that the cyclicity exists specific to the time change of the model predictive error, wherein a cycle of the time change of the model predictive error is the predictive error variation cycle.

According to the structure, the predictive value correcting part corrects the predictive value of the controlled quantity predicted by using the model in the certain predictive error variation cycle by using the model predictive error in a predictive error variation cycle prior to the certain predictive error variation cycle when the judging part judges that the cyclicity exists specific to the time change of the model predictive error.

In addition, "the predictive value of the controlled quantity predicted by using the model in the certain predictive error variation cycle" corrected by the predictive value correcting part by using the model in the certain predictive error variation cycle by using the model predictive error in a predictive error variation cycle prior to the certain predictive error variation cycle can also be called as "a current predictive value".

Therefore, the model predictive control device achieves the following effect of, when a predictive value of the controlled quantity in the certain predictive error variation cycle is fluctuated due to a cyclic disturbance, correcting the predictive value in the certain predictive error variation cycle by using the model predictive error in a predictive error variation cycle prior to the certain predictive error variation cycle. The model predictive control device achieves the following effect of being more simply suitable for disturbance compensation specific to machineries and devices in a broad range without the need of a disturbance model.

Preferably, the model predictive control device further comprises a error computing part, respectively computing continuous model predictive errors specific to a plurality of continuous control cycles; and an extremum detecting part, detecting a maximum and a minimum of the model predictive error according to a time change of the continuous model predictive errors respectively computed by the error computing part, wherein the judging part judges whether the cyclicity exists specific to the time change of the model predictive error from the moments of the maximum and the minimum respectively detected by the extremum detecting part.

According to the structure, the judging part judges whether the cyclicity exists specific to the time change of the model predictive errors from respective detection moments of the maximum and the minimum detected according to the time change of the model predictive errors respectively computed specific to the continuous control cycles.

Therefore, the model predictive control device achieves the following effect of correcting the predictive value of the controlled quantity predicted by using the model in the certain predictive error variation cycle by using the model in the certain predictive error variation cycle by using the model predictive error in a predictive error variation cycle prior to the certain predictive error variation cycle when the time change of the model predictive error is judged to have cyclicity from respective detection moments of the maximum and the minimum of the time change of the model predictive errors.

Preferably, in the model predictive control device, the judging part judges whether the cyclicity exists specific to the time change of the model predictive error based on a difference between an interval of the moments of maximums respectively detected by the extremum detecting part and an interval of the moments of minimums respectively detected by the extremum detecting part.

According to the structure, the judging part judges whether the cyclicity exists specific to the time change of the model predictive error based on a difference between the interval of the moments of the maximums respectively detected by the extremum detecting part and the interval of the moments of the minimums respectively detected by the extremum detecting part.

Therefore, the model predictive control device achieves the following effects of judging whether the cyclicity exists specific to the time change of the model predictive error based on a difference between the interval of the moments of the maximums respectively detected by the extremum detecting part and the interval of the moments of the minimums respectively detected by the extremum detecting part, and of correcting the predictive value of the controlled quantity predicted by using the model in the certain predictive error variation cycle by using the model in the certain predictive error variation cycle by using the model predictive error in a predictive error variation cycle prior to the certain predictive error variation cycle when the cyclicity is judged to exist.

For example, the judging part judges that the cyclicity exists specific to the time change of the model predictive error when a difference between an interval of the moments of the maximums respectively detected by the extremum detecting part and an interval of the moments of the minimums respectively detected by the extremum detecting part is smaller than a prescribed value.

Therefore, the model predictive control device achieves the following effects of judging that the cyclicity exists specific to the time change of the model predictive error when a difference between the interval of the moments of the maximums respectively detected by the extremum detecting part and the interval of the moments of the minimums respectively detected by the extremum detecting part is smaller than a prescribed value, and of correcting the predictive value of the controlled quantity predicted by using the model in the certain predictive error variation cycle by using the model in the certain predictive error variation cycle by using the model predictive error in a predictive error variation cycle prior to the certain predictive error variation cycle.

Preferably, in the model predictive control device, the extremum detecting part only detects maximums and minimums of which the difference is larger than the prescribed value in maximums and minimums of the model predictive error in the time change of the continuous model predictive errors.

According to the structure, the extremum detecting part only detects the maximums and the minimums of which the difference is larger than the prescribed value in the maximums and the minimums of the model predictive error in the time change of the continuous model predictive errors.

Herein, the model predictive error is computed by the error computing part as an error between an actually measured value of the controlled quantity of the controlled object and the predictive value of the controlled quantity predicted by using the model, and the actually measured value may contain a measured noise. Besides, the actually measured value may be affected by tiny vibration under a stop state caused by static friction. That is, the model predictive error computed by the error computing part may be affected by the measured noise that may be contained by the actually measured value.

The extremum detecting part only detects the maximums and the minimums of which the difference is larger than the prescribed value in the maximums and the minimums of the model predictive error in the time change of the continuous model predictive errors, therefore, the model predictive error affected by the measured noise can be prevented from being mis-detected into the extremum (maximums and minimums).

Therefore, the model predictive control device achieves the following effect of judging whether the cyclicity exists specific to the time change of the model predictive error by using a detecting moment of the extremum detected with a high precision.

Preferably, in the model predictive control device, the extremum detecting part (1) respectively detects the maximums in a manner that an interval between the detecting moments of the maximums is longer than a prescribed cycle, and (2) respectively detects the minimums in a manner that an interval between the detecting moments of the minimums is longer than a prescribed cycle.

According to the structure, the extremum detecting part respectively detects the maximums (minimums) in a manner that an interval between the detecting moments of the maximums (minimums) is longer than a prescribed cycle. That is, the extremum detecting part cannot determine the extremum (that is, not considered as the maximum and (minimum)) when the difference (interval) of the detecting moments of the maximums (minimums) is shorter than a prescribed cycle. The extremum detecting part for example can also be considered in a manner: a peak (valley), the difference between which and the detecting moment of the maximum (minimum) determined previously does not meet the prescribed cycle, is not the maximum (minimum).

Herein, for example, when a curve expressing a time change of the model predictive error is a large cycle curve containing small cycle curves, the cycle used when the cyclicity of the time change of the model predictive error is judged is the cycle of the large cycle curve.

Therefore, the model predictive control device achieves the following effects of correctly judging whether the cyclicity exists specific to the time change of the model predictive error since the detected interval of the moments of the extremums (maximum or minimum) longer than the interval of the prescribed cycle is used for judging whether the cyclicity exists.

Preferably, the model predictive control device further comprises: an receiving part, accepting a user operation of a cycle lower limit value designated, and the judging part (1) uses an interval longer than the cycle lower limit value in the intervals between the detecting moments of the maximums as an interval used for judging whether the cyclicity exists and detecting intervals of moments of the maximums when the extremum detecting part detects a plurality of maximums, and (2) uses an interval longer than the cycle lower limit value in the intervals between the detecting moments of the minimums as an interval used for judging whether the cyclicity exists and detecting intervals of moments of the minimums when the extremum detecting part detects a plurality of minimums.

According to the structure, the judging part (1) uses the intervals longer than the cycle lower limit value in the intervals between the detecting moments of the maximums as the interval used for judging whether the cyclicity exists and detecting intervals of the moments of the maximums and (2) uses the intervals longer than the cycle lower limit value in the intervals between the detecting moments of the minimums as the interval used for judging whether the cyclicity exists and detecting intervals of the moments of the minimums.

Herein, for example, when the curve expressing the time change of the model predictive error is the large cycle curve containing small cycle curves, the cycle used when the cyclicity of the time change of the model predictive error is judged is the cycle of the large cycle curve.

Therefore, the model predictive control device achieves the following effects of correctly judging whether the cyclicity exists specific to the time change of the model predictive error since the detected interval of the moments of the (maximum or minimum) longer than the interval of the prescribed cycle is used for judging whether the cyclicity exists.

Preferably, the model predictive control device further comprises a display control part, displaying the time change of the model predictive error to a user.

According to the structure, the display control part displays the time change of the model predictive error to the user.

Therefore, the model predictive control device achieves the following effect that since the time change of the model predictive error is displayed to the user, the user can approximately master a disturbance form according to a waveform occurring in the time change (so-called trend graph) of the model predictive error displayed by the model predictive control device.

Preferably, the model predictive control device further comprises: a torque computing part, computing a torque required by the predictive value corrected by the predictive value correcting part to follow the command value; and a torque command part, outputting the torque computed by the torque computing part as a command value related to torque control of the controlled object to a control system performing motion control over the controlled object.

According to the structure, the torque computing part computes a torque required by the predictive value corrected by the predictive value correcting part to follow the command value; and the torque command part outputs the torque computed by the torque computing part as a command value related to torque control of the controlled object to a control system performing motion control over the controlled object.

Therefore, the model predictive control device achieves the following effect of being capable of outputting the torque causing the controlled quantity of the controlled object to follow the command value to the control system without a need to execute an operation processing of converting a change of the controlled quantity caused by the disturbance into an operating quantity.

Preferably, the model predictive control device further comprises a command value correcting part, correcting the command value in a manner that the predictive value corrected by the predictive value correcting part follows the command value; and a position command part, outputting a corrected command value as a command value related to position control of the controlled object to a control system performing motion control over the controlled object, wherein the corrected command value is the command value corrected by the command value correcting part.

According to the structure, the command value correcting part corrects the command value in a manner that the predictive value corrected by the predictive value correcting part follows the command value; and the position command part outputs a corrected command value as a command value related to position control of the controlled object to the control system performing motion control over the controlled object, wherein the corrected command value is the command value corrected by the command value correcting part.

Therefore, the model predictive control device achieves the following effect of being capable of outputting the command value corrected in a manner that the controlled quantity of the controlled object follows the command value to the control system without a need to execute an operation processing of converting a change of the controlled quantity caused by the disturbance into an operating quantity.

Besides, in order to solve the problem, a control method in a form of the present invention is a control method of the model predictive control device, the model predictive control device uses a model of a controlled object to predict a controlled quantity of the controlled object corresponding to a command value generated in each control cycle according to a target trajectory, and the control method is characterized by comprising: a judging step, judging whether cyclicity exists specific to a time change of a model predictive error, wherein the model predictive error is an error between an actually measured value of the controlled quantity of the controlled object and a predictive value of the controlled quantity predicted by using the model; and a predictive value correcting step, correcting the predictive value of the controlled quantity predicted by using the model in a certain predictive error variation cycle by using the model predictive error in a predictive error variation cycle prior to the certain predictive error variation cycle when the judging step judges that the cyclicity exists specific to the time change of the model predictive error, wherein a cycle of the time change of the model predictive error is the predictive error variation cycle.

According to the control method, the predictive value correcting step corrects the predictive value of the controlled quantity predicted by using the model in the certain predictive error variation cycle by using the model predictive error in a predictive error variation cycle prior to the certain predictive error variation cycle when the judging part judges that the cyclicity exists specific to the time change of the model predictive error.

In addition, "the predictive value of the controlled quantity predicted by using the model in the certain predictive error variation cycle" corrected by the predictive value correcting part by using the model in the certain predictive error variation cycle by using the model predictive error in a predictive error variation cycle prior to the certain predictive error variation cycle can also be called as "a current predictive value".

Therefore, the control method achieves the following effect of, when a predictive value of the controlled quantity in the certain predictive error variation cycle is fluctuated due to a cyclic disturbance, correcting the predictive value in the certain predictive error variation cycle by using the model in the certain predictive error variation cycle by using the model predictive error in a predictive error variation cycle prior to the certain predictive error variation cycle. The control method achieves the following effect of being more simply suitable for disturbance compensation specific to machineries and devices in a broad range without the need of a disturbance model.

The present invention achieves the following effect of being more simply suitable for disturbance compensation specific to machineries and devices in a broad range without the need of a disturbance model.

DESCRIPTION OF THE EMBODIMENTS

Embodiment 1

Embodiment 1 of the present invention is explained in detail based on FIG. 1 to FIG. 11(A) and FIG. 11(B). The same or equivalent parts are labelled with the same sign and are not explained repeatedly. In order to facilitating understanding on a controller 10 (model predictive control device) in one form of the present invention, at first, FIG. 2 is used to explain a summary of a control system 1 containing the controller 10.

(Summary of the Control System)

Figure 2:
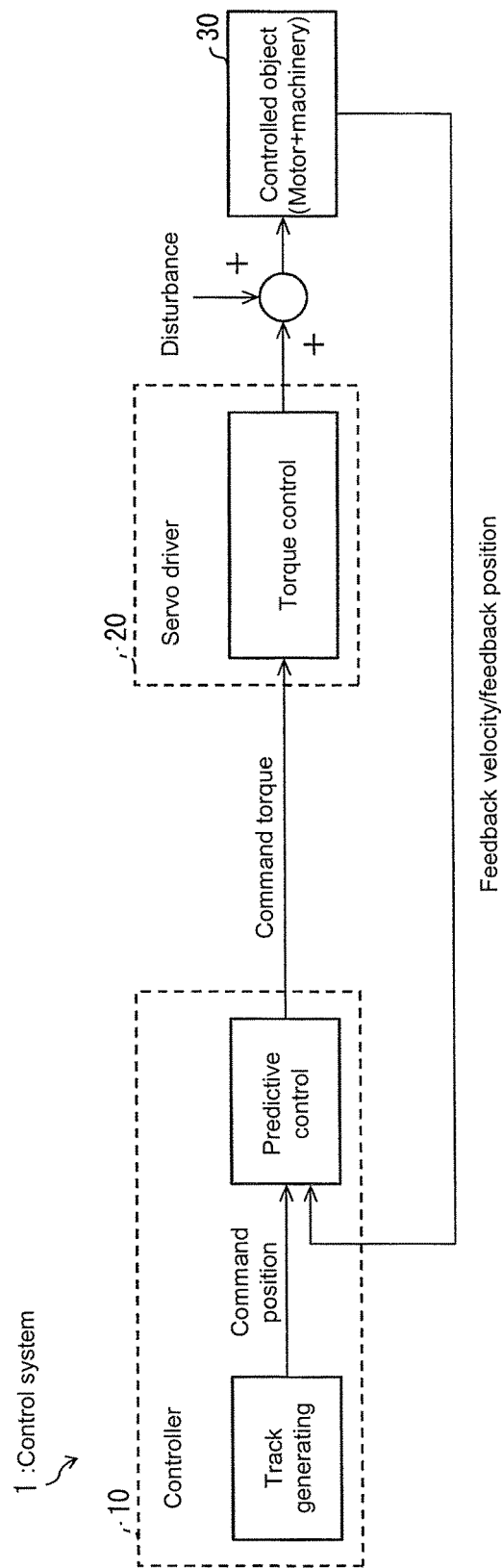
FIG. 2 is a diagram illustrating a summary of a control system containing the controller in FIG. 1.

FIG. 2 is a diagram illustrating a summary of a control system 1 containing the controller 10. The control system 1 is required to quickly inhibit a fluctuation of the controlled quantity caused by cyclic disturbance. The controller 10 of the control system 1 does not use a disturbance model for disturbance compensation, and therefore, achieves an effect of being more simply suitable for disturbance compensation specific to machineries and devices in a broad range. The controller 10 is suitable for control over cyclic actions (action cycle) and also suitable for control over noncyclic continuous actions. The disturbance compensation executed by the controller 10 does not use the action cycle and thus can be suitable for the control over continuous and irregular actions.

The controller 10 for example is a control device (upper controller) having a prediction mechanism such as a Model Predictive Control (MPC). The controller 10 judges whether cyclicity related to variation of a predictive error exists, and when it is judged that the cyclicity exists, the prediction of the controlled quantity is corrected by using the predictive error data prior to one cycle (one predictive error variation cycle) specific to a cycle of the time change of the predictive error, i.e., predictive error variation cycle. For example, in the processing machinery, when a disturbance such as a vibration excited by acceleration and deceleration of a tool and a table, a shake from other peripheral other machineries, etc., is generated, the controller 10 can maintain the control performance. Besides, the controller 10 can maintain a quality of a manufactured object by maintaining the control performance.

The control system 1 contains (1) the controller 10, for example, being a Programmable Logic Controller (PLC); (2) a servo driver 20 as a lower controller controlled by the controller 10 as the upper controller; and (3) a controlled object 30 (for example motor or machinery), controlled by the servo driver 20. In the control system 1, the controller 10 executes position/velocity control, and outputs a torque command value to the servo driver 20 by prediction control.

The controller 10 is a controller having a model predictive control mechanism, and outputs a torque command value as an operating quantity to the servo driver 20. The controller 10 for example accepts target trajectory data (target trajectory) (trajectory generation) from outside such as a user, and generates a command value (command position) in each control cycle according to the accepted target trajectory data. Besides, the controller 10 obtains output of the controlled object 30, i.e., the controlled quantity (an actually measured value of the controlled quantity) from the controlled object 30 as feedback information. That is, the controller 10 obtains a velocity and position (at least one of the velocity and position) output from the controlled object 30 as a feedback velocity and a feedback position (at least one of the feedback velocity and the feedback position).

The controller 10 has a model of the controlled object 30 (and the servo driver 20) as an internal model, and by using the internal model, based on the generated command position and "the output of the controlled object 30, i.e., the controlled quantity", the torque command value as the operating quantity is output to the servo driver 20. Herein, the controller 10 uses the model of the controlled object (i.e., the controlled object 30 and the servo driver 20) to predict the controlled quantity, and infers the predictive error for disturbance compensation. The controller 10 stores and uses a disturbance pattern with a dimensionality of the controlled quantity, and therefore, the operation for inferring disturbance expect for the operation for computing the controlled quantity does not need to be prepared separately (but, to be more specifically speaking, what is stored in the controller 10 is not "disturbance pattern" and is a predictive error pattern containing disturbance information). Therefore, the controller 10 is small in operation load compared with a device which also performs the operation for inferring disturbance except for the operation for computing the controlled quantity, which becomes an important merit in motion control requiring a high velocity control cycle.

The servo driver 20 executes torque control over the controlled object 30 according to the torque command value from the controller 10.

(Summary of the Controller)

Figure 1:
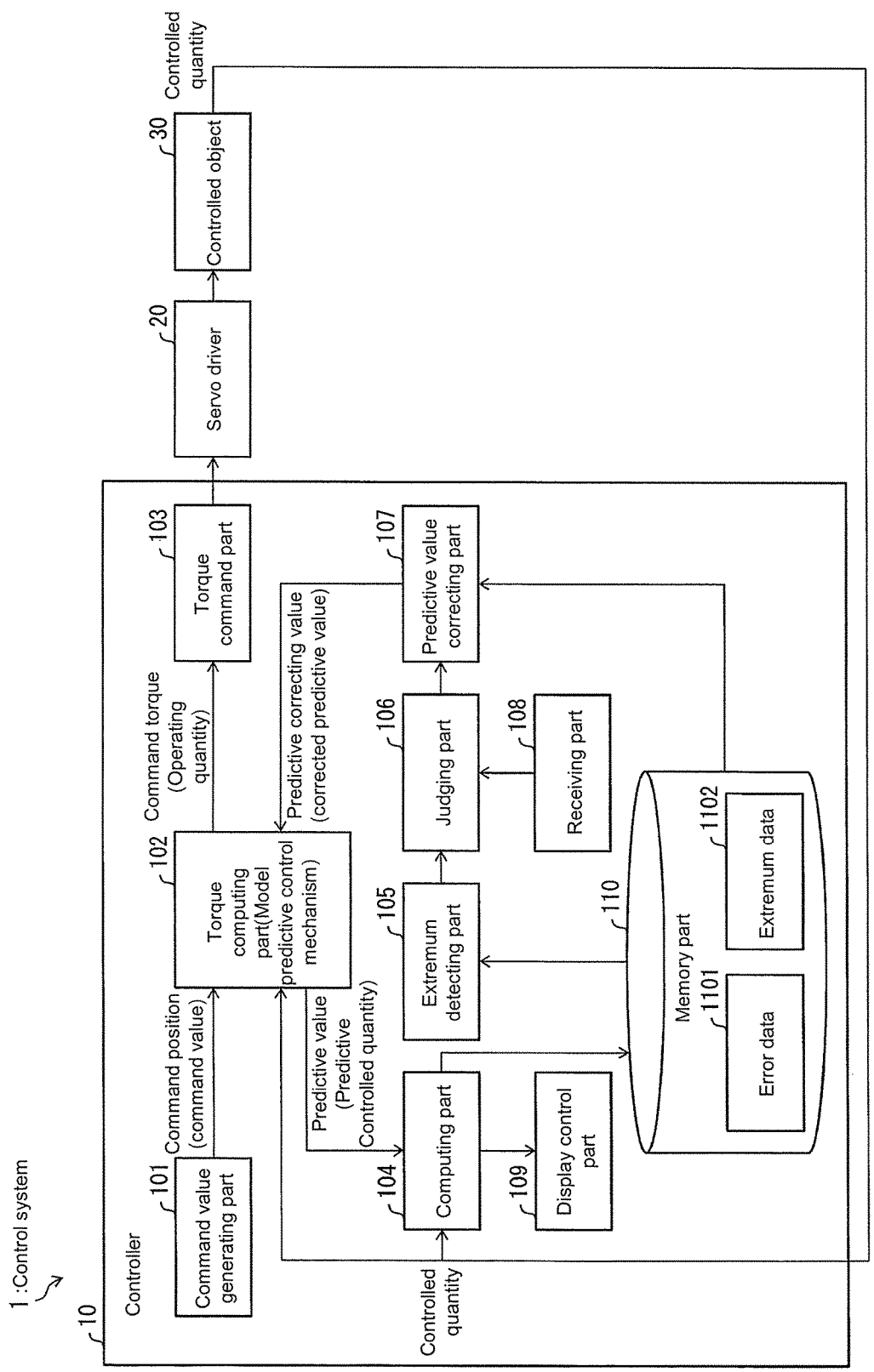
FIG. 1 is a block diagram illustrating a main part structure of a controller of an embodiment 2 of the present invention.

As so far, FIG. 2 is used to explain the controller 10 contained in the control system 1, and then the structure and processed content are explained with FIG. 1. Before detailed content is explained by referring to FIG. 1, the summary is cleared up as follows to conveniently understand the controller 10.

The controller 10 (model predictive control device) is a model predictive control device, and uses a model of the controlled object 30 to predict the controlled quantity of the controlled object 30 corresponding to a command value generated in each control cycle according to a target trajectory, the model predictive control device comprises: a judging part 106, judging whether cyclicity exists specific to a time change of a model predictive error, wherein the model predictive error is an error between an actually measured value of the controlled quantity of the controlled object 30 and a predictive value of the controlled quantity predicted by using the model; and a predictive value correcting part 107, correcting the predictive value of the controlled quantity predicted by using the model in a certain predictive error variation cycle by using the model predictive error in a predictive error variation cycle prior to the certain predictive error variation cycle when the judging part 106 judges that the cyclicity exists specific to the time change of the model predictive error, wherein a cycle of the time change of the model predictive error is the predictive error variation cycle.

According to the structure, the predictive value correcting part 107 corrects the predictive value of the controlled quantity predicted by using the model in the certain predictive error variation cycle by using the model predictive error in a predictive error variation cycle prior to the certain predictive error variation cycle when the judging part judges that the cyclicity exists specific to the time change of the model predictive error.

In addition, "the predictive value of the controlled quantity predicted by using the model in the certain predictive error variation cycle" corrected by the predictive value correcting part 107 by using the model in the certain predictive error variation cycle by using the model predictive error in a predictive error variation cycle prior to the certain predictive error variation cycle can also be called as "a current predictive value".

Therefore, the controller 10 achieves the following effect of, when a predictive value of the controlled quantity in the certain predictive error variation cycle is fluctuated due to a cyclic disturbance, correcting the predictive value in the certain predictive error variation cycle by using the model predictive error in a predictive error variation cycle prior to the certain predictive error variation cycle. The controller 10 achieves the following effect of being more simply suitable for disturbance compensation specific to machineries and devices in a broad range without the need of a disturbance model.

The controller 10 further comprises a error computing part 104, respectively computing continuous model predictive errors specific to a plurality of continuous control cycles; and an extremum detecting part 105, detecting a maximum and a minimum of the model predictive error according to a time change of the continuous model predictive error respectively computed by the error computing part 104, wherein the judging part 106 judges whether the cyclicity exists specific to the time change of the model predictive error from the moments of the maximum and the minimum respectively detected by the extremum detecting part 105.

According to the structure, the judging part 106 judges whether the cyclicity exists specific to the time change of the model predictive error from respective detection moments of the maximum and the minimum detected according to the time change of the model predictive error respectively computed specific to the continuous control cycles.

Therefore, the controller 10 achieves the following effect of correcting the predictive value of the controlled quantity predicted by using the model in the certain predictive error variation cycle by using the model in the certain predictive error variation cycle by using the model predictive error in a predictive error variation cycle prior to the certain predictive error variation cycle when the cyclicity is judged to exist specific to the time change of the model predictive error from respective detection moments of the maximum and the minimum of the time change of the model predictive error.

The controller 10 further comprises: a torque computing part 102, computing a torque required for the predictive value corrected by the predictive value correcting part 107 to follow the command value; and a torque command part 103, outputting the torque computed by the torque computing part 102 as a command value related to torque control of the controlled object 30 to the servo driver 20 (a control system performing motion control over the controlled object 30).

According to the structure, the torque computing part 102 computes a torque required for the predictive value corrected by the predictive value correcting part 107 to follow the command value; and the torque command part 103 outputs the torque computed by the torque computing part 102 as a command value related to torque control of the controlled object 30 to the servo driver 20.

Therefore, the controller 10 achieves the following effect of being capable of outputting the torque causing the controlled quantity of the controlled object 30 to follow the command value to the servo driver 20 without a need to execute an operation processing of converting a change of the controlled quantity caused by the disturbance into an operating quantity.

(Regarding a Relation Between the Control Cycle and a Predictive Error Variation Cycle)

Regarding a relation (difference) between the control cycle and the predictive error variation cycle in the control system 1, the following aspects must be noted. In the control system 1, the so-called "control cycle" is a cycle that the controller 10 repeatedly executes a control action, for example, is very short time (cycle) such as 0.25 ms and lens. Relatively, the so-called "predictive error variation cycle" is time (cycle) of a time change of the error, i.e., model predictive error, between the predictive value of the controlled quantity computed by the controller 10 (torque computing part 102) and a feedback controlled quantity (an actually measured value of the controlled quantity of the controlled object 30). A cycle that the time change of the model predictive error has cyclicity (the predictive error variation cycle) is longer than the control cycle, for example in a range of 50 ms or 1 s.

The controller 10 computes the error, i.e., model predictive error, between the predictive value of the controlled quantity predicted by using a model of the controlled object 30 (and the servo driver 20) and the feedback controlled quantity from the controlled object 30 (an actually measured value of the controlled quantity of the controlled object 30) in each "control cycle". The controller 10 arrays a plurality of continuous model predictive errors along a time sequence and judges whether cyclicity exists specific to a time change of the model predictive error. The controller 10 computes the cycle of the time change of the model predictive error, i.e., the "predictive error variation cycle", when judging that the time change of the model predictive error exists cyclicity. Besides, regarding the "predictive error variation cycle", the controller 10 corrects the predictive value of the controlled quantity predicted in a "certain predictive error variation cycle" by using the model predictive error in a "predictive error variation cycle" prior to the "certain predictive error variation cycle".

In addition, the "certain predictive error variation cycle" is not designated, and not determined at a current moment. What is determined is a variation cycle prior to the current (that is, a "predictive error variation cycle" prior to the "certain predictive error variation cycle"). The controller 10 corrects the predictive value of the (future) controlled quantity predicted at a current moment (i.e., the predictive value of the controlled quantity in "certain predictive error variation cycle") by using "(past) variation cycle prior to the current".

(Details of the Controller)

As mentioned above, the controller 10 judges whether disturbance has cyclicity according to the time change of an error, i.e., model predictive error, between the predictive value of the controlled quantity predicted by using the controlled object 30 (and the servo driver 20) and the feedback controlled quantity from the controlled object 30. Besides, when judging that cyclicity exists, regarding the predictive error variation cycle (the cycle of the time change of the model predictive error), the controller 10 corrects the predictive value of the controlled quantity predicted by using the model in the certain predictive error variation cycle by using the model prediction error in a predictive error variation cycle prior to the certain predictive error variation cycle. For the controller 10 of which the summary is explained, details of the structure of the controller are explained with FIG. 1.

In addition, as mentioned above, the "certain predictive error variation cycle" is not designated, and not determined at a current moment. What is determined is a variation cycle prior to the current (that is, a "predictive error variation cycle") prior to the "certain predictive error variation cycle"). The controller 10 corrects the predictive value of the (future) controlled quantity predicted at a current moment (i.e., the predictive value of the controlled quantity in "certain predictive error variation cycle") by using "(past) variation cycle prior to the current".

FIG. 1 is a block diagram illustrating a main part structure of the controller 10 of the embodiment 1 of the present invention. The controller 10 as shown in FIG. 1 structurally has a command generating part 101, a torque computing part 102, a torque command part 103, a error computing part 104, an extremum detecting part 105, a judging part 106, a predictive value correcting part 107, an receiving part 108, a display control part 109 and a memory part 110. In addition, in order to ensure compactness of recording, structures not directly related to the present embodiment are omitted in the explanation and block diagram. But, according to an actual implementing case, the controller 10 can also have the omitted structures. Respective function blocks of the command value generating part 101, the torque computing part 102, the torque command part 103, the error computing part 104, the extremum detecting part 105, the judging part 106, the predictive value correcting part 107, the receiving part 108 and the display control part 109 and the like for example can be realized through a following manner: that is, a program stored in the memory device (memory part 110) implemented as a Read Only Memory (ROM) and a Non-Volatile Random Access Memory (NVRAM) is read out by a Central Processing Unit (CPU) to a Random Access Memory (RAM) for execution. Hereinafter, each function block in the controller 10 is explained.

The command value generating part 101 accepts target trajectory data (target trajectory) (trajectory generation) from outside (for example a user), and generates a command value in each control cycle according to the accepted target trajectory data. The command value generating part 101 sends the generated command value (command position) to the torque computing part 102.

The torque computing part 102 executes Model Predictive Control (MPC). Specifically speaking, an internal model of the controlled object 30 is used to predict a future state to decide the controlled quantity in a manner that the future output of the controlled object 30 (predictive value of the controlled quantity) is approached to a target value (command value, i.e., the command position) as much as possible. That is, the torque computing part 102 predicts a future output change based on the internal model and decides input (operating quantity) in a manner of approaching to the target value as much as possible.

The torque computing part 102 contains the internal model for modelling actions of the controlled object 30, and uses the internal model to predict a controlled quantity output by the controlled object 30 in each control cycle. That is, the torque computing part 102 uses the internal model to compute the predictive value in each control cycle (predictive value of the controlled quantity). The torque computing part 102 notifies the error computing part 104 of the computed predictive value (predictive controlled quantity).

The internal module used for the torque computing part 102 to compute the predictive value of the controlled quantity of the controlled object 30 and decide the operating quantity not only comprises the model of the controlled object 30 but also comprises the model of the servo driver 20. That is, the torque computing part 102 uses the internal models of the controlled object 30 and the servo driver 20 to compute the predictive value of the controlled quantity of the controlled object 30 and decides the operating quantity in a manner that the predictive value is approached to the command value (i.e., command position).

Herein, when the characteristics of the controlled object (that is the whole of the servo driver 20 and the controlled object 30, a range from the output of the controller to the input of the controller) viewed from the controller 10 contains dead time, there is the following problem: that is, the precision of disturbance inferring of the controller 10 is reduced, if the dead time is increased, then a full compensation effect cannot be obtained. As an example that the controlled object viewed from the controller 10 contains the dead time, a system that an output device such as the controller 10 and the servo driver 20 are connected through communication can be listed. Viewed from the controller 10, a whole of the servo driver 20 and the controlled object 30 becomes a controlled object (controlled object), therefore, it is basic that the internal model contains the model of the servo driver 20. But, generally speaking, compared with the characteristic of the controlled object, the characteristic of the torque control part containing the servo driver 20 has fully high velocity, therefore, the characteristic of the servo driver 20 can be omitted (that is, a transfer function can be viewed as "1").

Besides, the torque computing part 102 uses the internal model to compute the predictive corrected value (corrected predictive value) obtained from the predictive value correcting part 107, that is, the predictive value (predictive value of the controlled quantity) corrected by the predictive value correcting part 107 to follow a torque required by the command value (command position). The torque computing part 102 uses the computed torque as the command torque (operating quantity) and notifies the torque command part 103.

The torque command part 103 uses the command torque (operating quantity) notified from the torque computing part 102 as a command value related to the torque control of the controlled object 30 and outputs to the servo driver 20 (control system performing motion control over the controlled object 30).

The error computing part 104 computes an error, that is the model predictive error, between the output (actually measured value of the controlled quantity) of the controlled object 30 in a certain control cycle and the predictive value (predictive controlled quantity) of the controlled quantity in the certain control cycle in each control cycle. That is, the error computing part 104 calculates an error (model predictive error in the certain control cycle) between "the predictive value (predictive controlled quantity) of the controlled quantity in certain control cycle notified from the torque computing part 102 and "the output (actually measured value of the controlled quantity) of the controlled object 30 in the certain control cycle".

The error computing part 104 notifies the extremum detecting part 105 of "the model predictive error in the certain action cycle" computed in each control cycle. The error computing part 104 stores into the memory part 110 as error data 1101. Besides, the error computing part 104 notifies the display control part 109 of the computed "model predictive error in the certain action cycle".

The extremum detecting part 105 detects a maximum and a minimum of the model predictive error (time change of the model predictive error) according to the time change of the model predictive error (as the model predictive error stored in the memory part 110 as error data 1101) computed by the error computing part 104 in each control cycle. That is, the extremum detecting part 105 for example obtains a predictive error variation waveform expressing the time change of the model predictive error notified from the error computing part 104 in each control cycle. Besides, in the predictive error variation waveform, the extremum detecting part 105 detects (determines) an extremum about the time change of the model predictive error. In each control cycle, the extremum detecting part 105 notifies the judging part 106 of the detected extremum together with a generating moment of the extremum (detecting moment). The extremum detecting part 105 can also store the detected extremum together with the generating moment (detecting moment) of the extremum into the memory part 110 as extremum data 1102.

Besides, the extremum detecting part 105 can also obtains the cycle lower limit value designated in a user operation accepted by the receiving part 108 from the receiving part 108. The extremum detecting part 105 for example determines at least one of the maximum and the minimum in the time change of the model predictive error from the predictive error variation waveform, it can be also be viewed that a peak (valley), the difference between which and the detecting moment of the maximum (minimum) determined previously does not meet the prescribed value, is not the maximum (minimum). That is, the extremum detecting part 105 does not determine the extremum (not viewed as the maximum (minimum)) when a difference between the detecting moments of the maximums (minimums) is shorter than the cycle lower limit value.

The extremum detecting part 105 (1) respectively detects the maximums in a manner that an interval between the detecting moments of the maximums is longer than a prescribed cycle, and (2) respectively detects the minimums in a manner that an interval between the detecting moments of the minimums is longer than a prescribed cycle.

The judging part 106 judges whether cyclicity exists specific to a time change of the error, that is the model predictive error, between the actually measured value of the controlled quantity of the controlled object 30 and the predictive value of the controlled quantity predicted by using the model in each control cycle. Regarding the judging method of the judging part 106, detailed content will be mentioned later by using FIGS. 5 and 8, the judging part 106 for example judges whether the cyclicity exists specific to the time change of the model predictive error from the moments of the maximum and the minimum respectively detected by the extremum detecting part 105. That is, the judging part 106 computes a difference (time interval) between respective generating moments (detecting moments) of the extremums computed by referring to the extremum data 1102 stored in the memory part 110. Besides, the judging part 106 can also judge whether the computed time intervals are approached to each other, and therefore, whether the cyclicity exists is judged specific to the time change of the model predictive error.

Besides, the judging part 106 obtains the cycle lower limit value designated in a user operation accepted by the receiving part 108 from the receiving part 108. The judging part 106 uses the interval longer than the cycle lower limit value in the intervals between the detecting moments of the maximums as the interval used for judging whether the cyclicity exists and detecting the intervals of the moments of the maximums when the extremum detecting part 105 detects a plurality of maximums, and uses the interval longer than the cycle lower limit value in the intervals between the detecting moments of the minimums as the interval used for judging whether the cyclicity exists and detecting the intervals of the moments of the minimums when the extremum detecting part 105 detects a plurality of minimums.

In addition, the error computing part 104, the extremum detecting part 105 and the judging part 106 execute respective processing in each control cycle. That is, the error computing part 104 computes a predictive error in each control cycle, the extremum detecting part 105 detects an extremum (maximum and minimum) in each control cycle, and the judging part 106 judges whether cyclicity exists specific to the time change of the model predictive error by using the time interval (difference between the detecting moments) of the minimums (minimums)) detected by the error computing part 104 in each control cycle. But, the display control part 109 mentioned later can display the time change of the model predictive error to a user through batch processing of each action cycle. Even the time change of the model predictive error needs to be displayed in each control cycle, but due to a large processing quantity, the display control part 109 may display the time change of the model predictive error in each action cycle.

When the judging part 106 judges that the cyclicity exists, regarding the time change of the model predictive error, the predictive value correcting part 107 corrects the predictive value of the controlled quantity predicted by using the model in a certain predictive error variation cycle by using the model predictive error in a predictive error variation cycle prior to the certain predictive error variation cycle. Besides, the predictive value correcting part 107 notifies the torque computing part 102 of the corrected predictive value (predictive value of the controlled quantity, that is, predictive controlled quantity), that is, predictive correcting value (corrected predictive value).

The receiving part 108 accepts a user operation designating a cycle lower limit value. The receiving part 108 notifies the judging part 106 (and the extremum detecting part 105) of the cycle lower limit value designated in the user operation.

Besides, the receiving part 108 can also accept the user operation designating a reference value (a value of EPS1 mentioned later), and this reference value is used when the judging part judges whether the cyclicity exists specific to the time change of the model predictive error.

Further, the receiving part 108 can also accept the user operation designating a threshold, which is used when the extremum detecting part 105 detects (determines) an extremum. The extremum detecting part 105 for example can determine the peak (valley) as the maximum (minimum) when a difference between the peak and the valley exceeds the threshold designated by the user when the extremum (the maximum as the peak and the valley as the minimum) is detected (determined) in the peak and valley of the predictive error variation waveform.

The display control part 109 displays the time change of the model predictive error to the user. The display control part 109 for example can also obtain the model predictive error in the "certain control cycle" computed by the error computing part 104 from the error computing part 104 and displays the time change of the model predictive error to the user by using the obtained model predictive error. Besides, the display control part 109 can also display the time change of the model predictive error to the user by referring to the error data 1101 stored in the memory part 110.

The memory part 110 is a memory device storing various data used by the controller 10. In addition, the memory part 110 can also non-temporarily store (1) a control program, (2) an Operating System (OS) program, which are executed by the controller 10, (3) application programs for executing various functions that the controller 10 have and (4) various data read when the application programs are executed. The data of (1)-(4) for example are stored in a Read Only Memory (ROM), a flash memory, an Erasable Programmable ROM (EPROM), an Electrically EPROM (EEPROM) (registered trademark), a Hard Disk Drive (HDD) and other nonvolatile memory devices.

The controller 10 can also have a temporary memory part not shown. The temporary memory part is the so-called working memory, including a volatile memory device such as a Random Access Memory (RAM) temporarily storing data for operation and an operation result in various processing processes executed by the controller 10.

The operation that which data are stored in which memory device is properly decided according to a user purpose, convenience, cost, physical limitation or the like of the controller 10. The memory part 110 further stores the error data 1101 and extremum data 1102.

The error data 1101 are information of the "model predictive error (in certain control cycle)" computed by the error computing part 104, and are stored to the memory part 110 by the error computing part 104.

The extremum data 1102 are information of the extremum in the time change of the model predictive error detected by the extremum detecting part 105 from the time change of the model predictive error and are stored in the memory part 110 by the extremum detecting part 105.

(Regarding Model Predictive Control)

Figure 3:
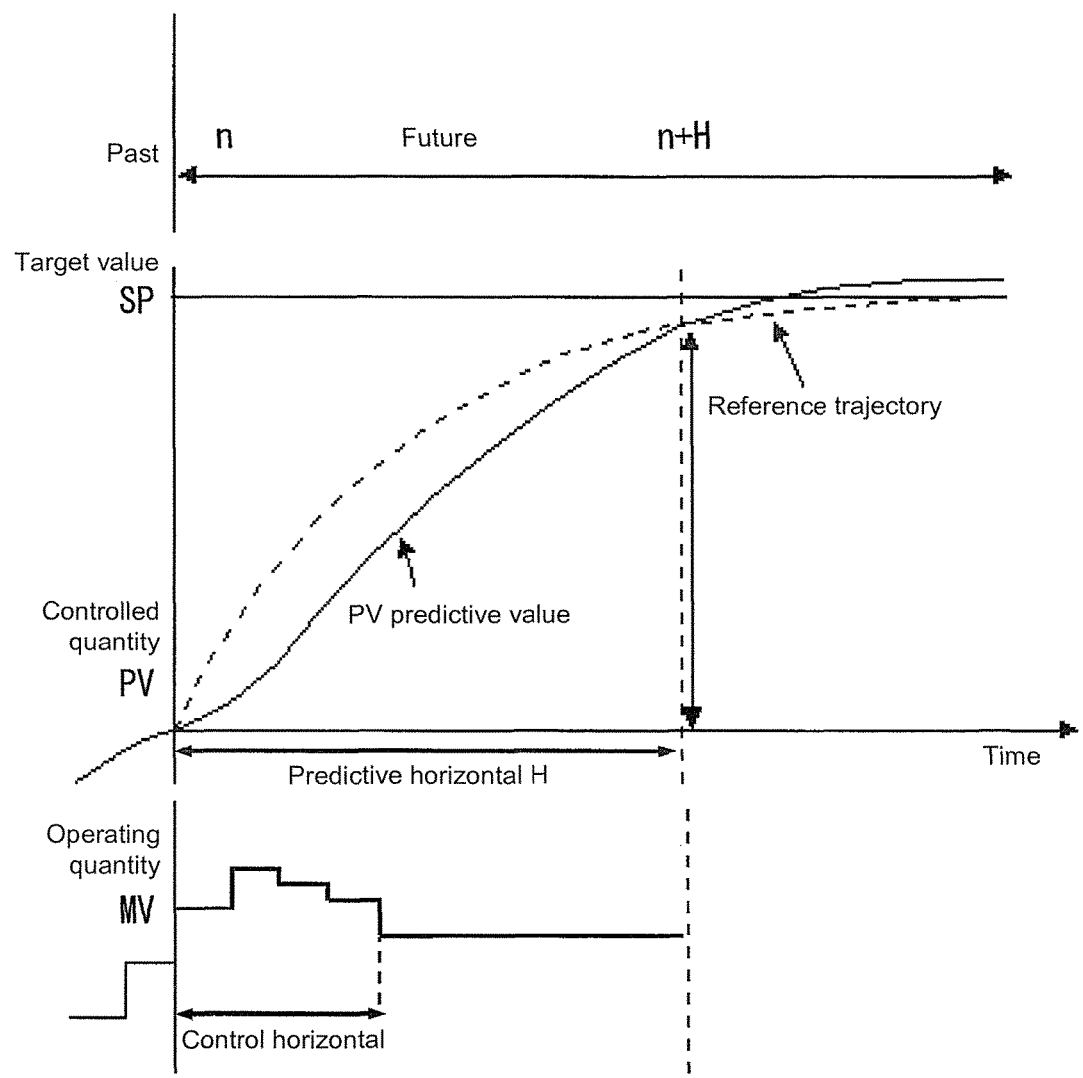
FIG. 3 is a diagram for explaining a summary of model predictive control executed by the controller in FIG. 1.

FIG. 3 is a diagram for illustrating model predictive control executed by the controller 10. The model predictive control decides a future operating quantity (the torque command value given to the servo driver 20 in the control system 1) for causing the controlled quantity to be consistent with a target point on a reference trajectory (the target trajectory in the control system 1) by using a model of the controlled object (the controlled object 30 (and the servo driver 20) in the control system 1), and repeatedly executes such processing in each cycle.

The controller 10, as shown in FIG. 3, measures a controlled quantity PV(n) at a current moment and computes the reference trajectory gradually approached to a target value SP by taking the controlled quantity PV(n) at a current moment as a start point and shown by a virtual line. Herein, in order for simplicity, control horizontal is set into "1".

Next, the controller 10 uses an internal model (the model of the controlled object 30 (and the servo driver 20)) to predict and decides an operating quantity MV (n) at a current moment n in a manner that a predictive value PV(n+H) of the controlled quantity PV after the predictive horizontal H is consistent with the reference trajectory.

The controller 10 actually adds an obtained operating quantity MV(n) to the servo driver 20 and keeps this value till the next sampling moment n+1.

When the controlled quantity PV(n+1) is determined at the moment n+1, the controller 10 considers the moment t+1 as the current moment and decides the operating quantity in a manner that a future predictive value and the reference trajectory are consistent after the predictive horizontal H till the next sampling moment. This process is performed repeatedly.

Next, the predictive control executed by the controller 10 in the control system 1 is explained in detail.

The controller 10 performs predictive control by using the internal model as mentioned above, and in the control system 1, the internal model adopts an N times Auto Regressive eXogenous (ARX) model expressed in a discretization manner of sampling time as shown by the following formula. In addition, the model of the controlled object (the controlled object 30 (and the servo driver 20) in the control system 1) is not limited to an ARX modle and a step response model or other models can also be used.

$$Y(n) = -a1 \times Y(n-1) - a2 \times Y(n-2) - \ldots - aN \times Y(n-N) + b1 \times U(n-1) + b2 \times U(n-2) + \ldots + bM \times U(n-M) \quad \text{[Number 1]}$$

Herein,

Y(n): internal model output value at moment n
U(n): operating quantity at moment n
a1-aN, b1-bM: coefficient of internal model
N, M: internal model times The ARX model is decided in a manner for example of measuring a time sequence data of input and output of the controlled object (the controlled object 30 (and the servo driver 20) in the control system 1) in advance, that is, a time sequence data of an operating quantity MV and a controlled quantity PV, and using a least square method.

In the control method 1, the reference trajectory as shown by the virtual line in FIG. 3 uses a trajectory causing a deviation at the current moment n to exponentially approach to 0 with a time constant Tr.

That is, the target value R (n+H) on the reference trajectory after the predictive horizontal H can be solved by the following formula.

$$R(n+H)=SP(n+H)-\lambda H \times \{SP(n)-PV(n)\},$$

$$\lambda=\exp(-Tc/Tr)$$

Herein,

PV(n): controlled quantity at moment n

SP(n), SP(n+H): target values at moments n and n+H

R(n+H): target value on the reference trajectory before the predictive horizontal H Tc: sampling time Therefore, an increment computed from the controlled quantity PV(n) at the current moment n, that is, the increment (deviation) $\Delta P(n+H)$ of the controlled quantity PV required for causing the controlled quantity PV to be consistent with the target value R(n+H) on the reference trajectory after the predictive horizontal H is turned into $$\Delta P(n+H)=SP(n+H)-\lambda H \times \{SP(n)-PV(n)\}-PV(n)=(1-\lambda H)\{SP(n)-PV(n)\}+SP(n+H)-SP(n). \quad \text{[Number 2]}$$

Next, computing of the operating quantity MV is explained.

Under the condition of a linear controlled object, a model output action is solved by two addition operations as follows.

(1) Free Response

The current state is used as an initial value, according to the formula of the ARX model, the model output Yf(n+H) after the predictive horizontal H lasting to be 0 and as a future operating quantity MV is solved through repeated computing.

$$Yf(n+1)=-a1 \times Y(n)-a2 \times Y(n-1)- \ldots -aN \times Y(n-N+1)$$

$$Yf(n+2)=-a1 \times Yf(n+1)-a2 \times Y(n)- \ldots -aN \times Y(n-N+2)$$

. . .

$$Yf(n+H)=-a1 \times Yf(n+H-1)-a2 \times Yf(n+H-2)- \ldots -aN \times Y(n-N+H) \quad \text{[Number 3]}$$

(2) step Response

The initial state is set to be 0 to solve the model output S(H) in the step response of MV=1(100%) and at the moment H $$S(1)=b1$$

$$S(2)=-a1 \times S(1)+(b1+b2)$$

. . .

$$S(H)=-a1 \times S(H-1)-a2 \times S(H-2)- \ldots -aN \times S(H-N)+(b1+b2+ \ldots +bM) \quad \text{[Number 4]}$$

If MV is not 1(100%) and is set into MV(n) generally, then the step response output at the moment H is turned into $MV(n) \times S(H)$.

Herein, MV(n): operating quantity at moment n

Yf(n+H): free response output of the model after the predictive horizontal H

S(H): step response output of the model at moment H

According to the former item, when the operating quantity MV(n) is lasted after the moment n, the model output (predictive value of the controlled quantity) at a time point of the moment n+H becomes the following formula.

$$Y(n+H)=Yf(n+H)+MV(n) \times S(H)$$

Herein, the increment computed from Y(n), that is, the increment $\Delta M(n+H)$ of the expected model output after the predictive horizontal H is turned into $$\Delta M(n+H)=Yf(n+H)+MV(n) \times S(H)-Y(n).$$

Therefore, the operating quantity MV can be solved in a manner that as long as the increment $\Delta M(n+H)$ of the expected model output after the predictive horizontal H is equal to the increment $\Delta P(n+H)$ of the controlled quantity PV for causing the controlled quantity PV to be turned into the target value on the reference trajectory after the predictive horizontal H. That is, only the operating quantity MV of $$\Delta M(n+H)=\Delta P(n+H) \text{ needs to be solved.}$$

Herein, if a correcting quantity CH (n) is considered herein, then

According to $\Delta M(n+H)+CH(n)=\Delta P(n+H)$, $$Yf(n+H)+MV(n) \times S(H)-Y(n)+CH(n)=(1-\lambda H)\{SP(n)-PV(n)\}+SP(n+H)-SP(n) \quad \text{[Number 5]}$$

If MV(n) is solved, then $$MV(n)=[(1-\lambda H)\{SP(n)-PV(n)\}+SP(n+H)-SP(n)-Yf(n+H)+Y(n)-CH(n)]/S(H) \quad \text{[Number 6]}$$

When the internal model does not contain dead time, a computing formula of the former item MV is corrected into the dead time d.

Therefore, for actual process data, the moment n is replaced with moment n+d.

$$MV(n)=[(1-\lambda H)\{SP(n+d)-PV(n+d)\}+SP(n+H+d)-SP(n+d)-Yf(n+H)+Y(n)-CH(n)]/S(H) \quad \text{[Number 7]}$$

Herein, a required predictive value of PV(n+d) with reasonable similarity is solved by the following computing formula.

$$PV(n+d)=PV(n)+Y(n)-Y(n-d)$$

Herein, if the predictive correcting quantity Cd(n) of the dead time d is also considered, then according to $$PV(n+d)=PV(n)+Y(n)-Y(n-d)+Cd(n)$$

$$MV(n)=[(1-\lambda H)\{SP(n+d)-PV(n)+Y(n)-Y(n-d)+Cd(n)\}+SP(n+H+d)-SP(n+d)-Yf(n+H)+Y(n)-CH(n)]/S(H) \quad \text{[Number 8]}$$

In addition, after the operating quantity MV (n) at the moment n is computed, in order for next computing, the next model output Y(n+1) is solved in advance.

$$Y(n+1)=a1 \times Y(n)+a2 \times Y(n-1)+ \ldots +aN \times Y(n-N+1)+b1 \times MV(n)+b2 \times MV(n-1)+ \ldots +bM \times MV(n-M+1) \quad \text{[Number 9]}$$

wherein MV(n) is a value after perform limit processing on the operating quantity.

(One Example of Disturbance Compensation Processing)

Figure 4:
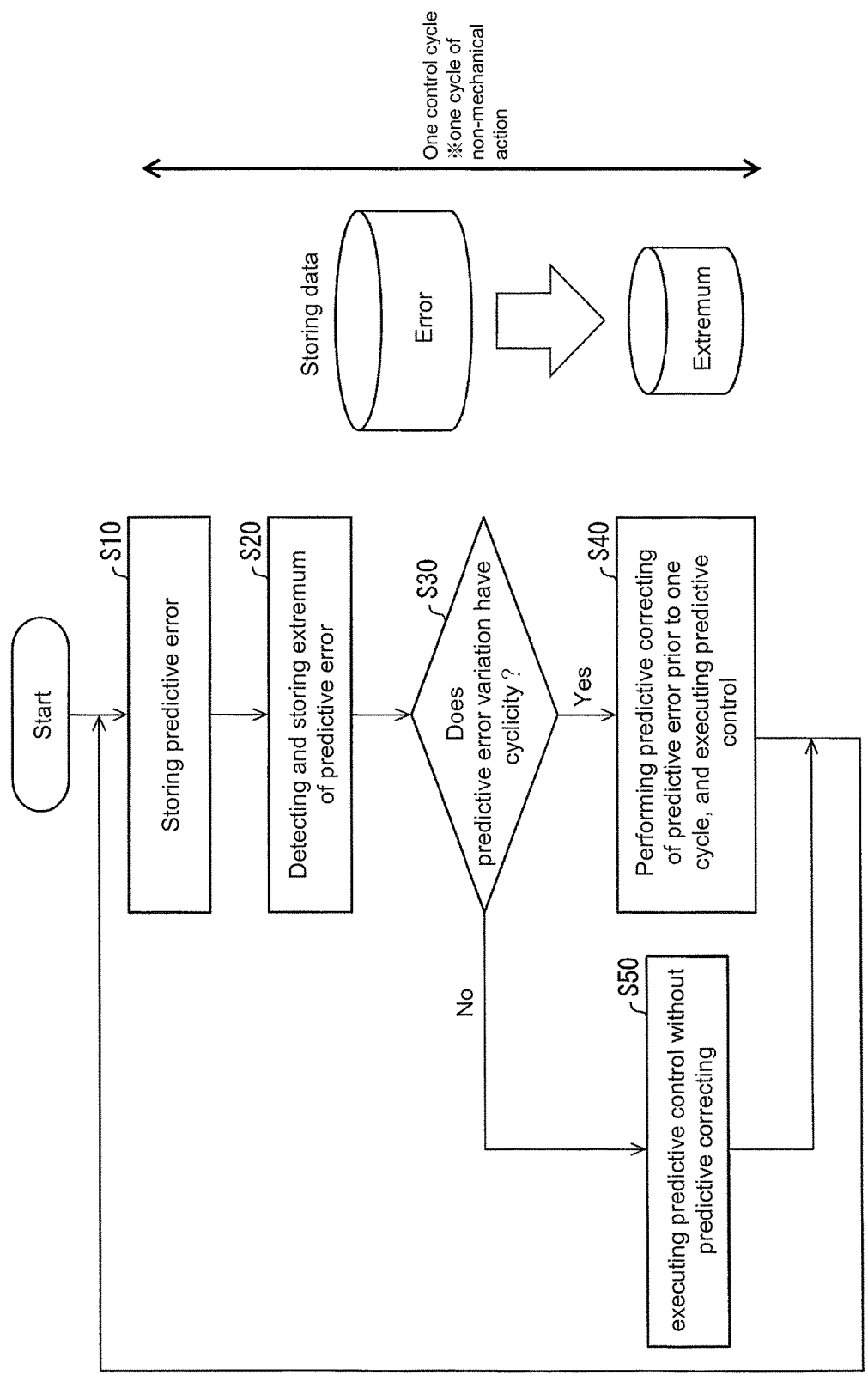
FIG. 4 is a flow chart of an example of disturbance compensation processing executed by the controller in FIG. 1.

FIG. 4 is a flow chart of an example of disturbance compensation processing executed by the controller 10. As shown in FIG. 4, the controller 10 stores a model predictive error (S10) and detects an extremum of the model predictive error from the data arraying the model predictive error along a time sequence (S20). Besides, the controller 10 uses the extremum to judge whether cyclicity exists specific to the time change of the model predictive error (S30). The controller 10 corrects the predictive value by using the predictive error prior to one cycle (one predictive error variation cycle) when judging that the time change of the model predictive error has cyclicity (YES in S30), and uses the corrected predictive value to execute predictive control (S40). The controller 10 does not correct the predictive value and executes predictive control (S50) when judging that the time change of the model predictive error has no cyclicity (NO in S30). The details are explained as follows.

In addition, in the following explanation, "PE(n)" is "the predictive error at the moment n in the cycle", and "PV(n)"

is the controlled quantity (the actually measured value of the controlled quantity output from the controlled object 30, for example feedback position) at the moment n in the cycle. Besides, "Y(n−d)" is the model predictive value at the moment (n−d) (the predictive value of the controlled quantity at the moment (n−d) in the cycle computed by the torque computing part 102 by using the internal model modelling the actions of the controlled object (that is, the controlled object 30 and the servo driver 20)), and "d" is "dead time". The dead time d is integer times of the control cycle of the controller 10.

The error computing part 104 computes the predictive error data of one cycle in each control cycle and notifies the extremum detecting part 105 of the computed model predictive error and stores into the memory part 110 as error data 1101 (S10). The error computing part 104 computes the model predictive error PE (n) through the following formula and notifies the extremum detecting part 105 of the computed model predictive error PE (n), and stores into the memory part 110 as the error data 1101.

The extremum detecting part 105 detects the maximum and the minimum of the model predictive error according to the time change of a plurality of continuous model predictive errors respectively computed by the error computing part 104 in each control cycle. That is, the extremum detecting part 105 for example detects the maximum and the minimum of the model predictive error from the curve (straight line) expressing the time change of the model predictive error notified from the error computing part 104 in each control cycle. Besides, the extremism detecting part 105 notifies the judging part 106 of the value of the detected extremum(maximum and minimum) together with the detected moment (detecting moment) in each control cycle. The extremum detecting part 105 can also store the detected extremum together with the generating moment (detecting moment) of the extremum as extremum data 1102 into the memory part 110 (S20).

The judging part 106 computes a difference (detecting moment difference) between the detecting moments of the extremums after the extremum detecting part 105 detects a plurality of extremums to judge whether cyclicity exists (S30). When the judging part 106 judges that the cyclicity exists (YES in S30) specific to the time change of the model predictive error, the predictive value correcting part 107 corrects the predictive value of the (future) controlled quantity predicted at a current moment (i.e., the predictive value of the controlled quantity in "certain predictive error variation cycle") by using the predictive error of the (past) variation cycle prior to the current (the "predictive error variation cycle" prior to the "certain predictive error variation cycle"). Besides, the torque computing part 102 uses the internal model to compute the predictive value (predictive value of the controlled quantity) corrected by the predictive value correcting part 107 to follow the torque required by a command value (command position). The torque command part 103 outputs the torque computed by the torque computing part 102 as a command torque (operating quantity) to the servo driver 20 (S40).

When the judging part 106 judges that there is no cyclicity specific to the time change of the model predictive error (NO in S30), the predictive value correcting part 107 does not correct the predictive value. Besides, the torque computing part 102 uses the internal model to compute the predictive value (predictive value of the controlled quantity) not corrected by the predictive value correcting part 107 to follow the torque required by the command value (command position). The torque command part 103 outputs the torque computed by the torque computing part 102 as the command torque (operating quantity) to the servo driver 20 (S50).

The processing (control method) executed by the controller 10 explained by referring to FIG. 4 is cleared up as follows. That is, the processing (control method) executed by the controller 10 is a control method of a model predictive control device, the model predictive control device uses a model of the controlled object 30 (and the servo driver 20) to predict a controlled quantity of the controlled object 30 corresponding to a command value generated in each control cycle according to a target trajectory, and the control method is characterized by comprising: a judging step (S30), judging whether cyclicity exists specific to a time change of a model predictive error, wherein the model predictive error is an error between an actually measured value of the controlled quantity of the controlled object 30 and a predictive value of the controlled quantity predicted by using the model; and a predictive value correcting step (S40), correcting the predictive value of the controlled quantity predicted by using the model in a certain predictive error variation cycle by using the model predictive error in a predictive error variation cycle prior to the certain predictive error variation cycle when the judging step judges that the cyclicity exists specific to the time change of the model predictive error, wherein a cycle of the time change of the model predictive error is the predictive error variation cycle.

According to the control method, the predictive value correcting step corrects the predictive value of the controlled quantity predicted by using the model in the certain predictive error variation cycle by using the model predictive error in a predictive error variation cycle prior to the certain predictive error variation cycle when the judging step judges that the cyclicity exists specific to the time change of the model predictive error.

In addition, "the predictive value of the controlled quantity predicted by using the model in the certain predictive error variation cycle" corrected by the predictive value correcting step S40 by using the model in the certain predictive error variation cycle by using the model predictive error in a predictive error variation cycle prior to the certain predictive error variation cycle can also be called as "a current predictive value".

Therefore, the control method achieves the following effect of, when a predictive value of the controlled quantity in the certain predictive error variation cycle is fluctuated due to a cyclic disturbance, correcting the predictive value in the certain predictive error variation cycle by using the model in the certain predictive error variation cycle by using the model predictive error in a predictive error variation cycle prior to the certain predictive error variation cycle. The control method achieves the following effect of being more simply suitable for disturbance compensation specific to machineries and devices in a broad range without the need of a disturbance model.

(Cyclicity Judging Method-Extremum Detecting and Storing of Predictive Error)

Figure 5:
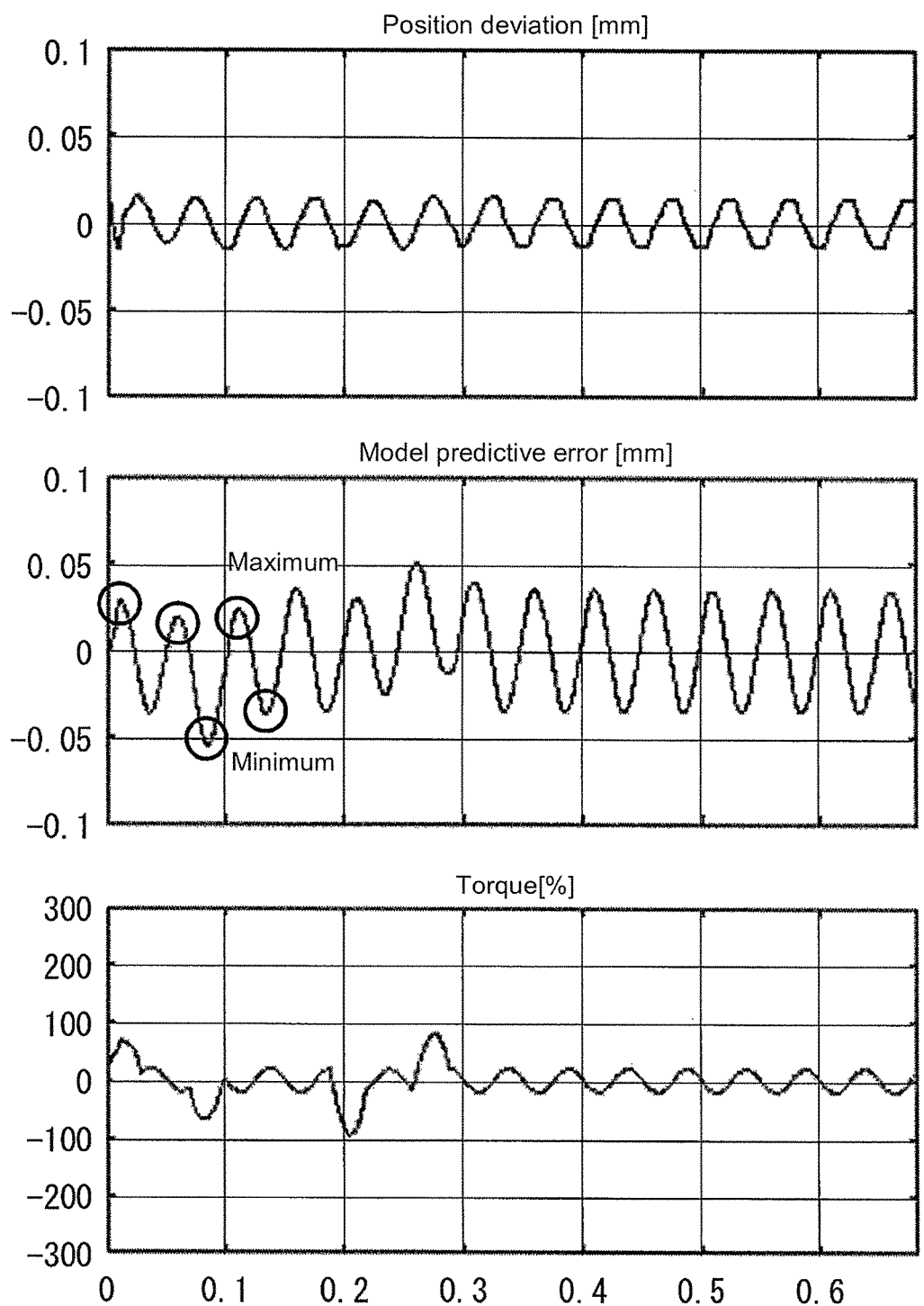
FIG. 5 is a diagram illustrating a method that the controller in FIG. 1 judges whether cyclicity exists specific to a time change of a model predictive error.

FIG. 5 is a diagram illustrating a method that the controller 10 judges whether cyclicity exists specific to a time change of a model predictive error. As explained in FIG. 4, the error computing part 104 checks (calculates) the predictive error in each control cycle, and stores the computed model predictive error as the error data 1101 to the memory part 110. Besides, the extremum detecting part 105 arrays the model predictive error computed by the error computing part 104 along a time sequence and detects the maximum and the minimum of the model predictive error according to the time change of the model predictive error.

Herein, the "model predictive error" as shown in by the middle section in FIG. 5 expresses a curve (straight line) that the model predictive error computed by the error computing part 104 (stored into the memory part 110 as the error data 1101) is arrayed along the time sequence. In addition, in the explanation below, the "curve (straight line) causing the model predictive error to be arrayed along the time sequence" is also called as "predictive error variation waveform".

The extremum detecting part 105 sequentially determines the maximums and the minimums circled from the curve of the "model predictive error" (predictive error variation waveform) as shown by the middle section of FIG. 5. Besides, the extremum detecting part 105 stores "P(j): jth extremum" and an occurring moment (detecting moment) of "Ptime(j): jth extremum" as the extremum data 1102 into the memory part 110 as determined extremum information.

The extremum detecting part 105 alternately determines the maximum and the minimum in the curve of the "model predictive error" (predictive error variation waveform) as shown by the middle section of FIG. 5. Herein, as long as the extremum detecting part 105 determines four or more maximums and minimums in total, then the judging part 106 can judge whether the cyclicity exists in the following step. That is, the extremum finally determined by the extremum detecting part 105 is P(K), and when the following condition is met, the judging part 106 judges that the cyclicity exists specific to the time change of the model predictive error.

$$|\{Ptime(k)-Ptime(k-2)\}-\{Ptime(k-1)-Ptime(k-3))\}|/|Ptime(k-1)-Ptime(k-3)|<EPS1 \quad \text{[Number 10]}$$

Herein, the EPS1 only needs to be predetermined in a range of "0" to "1". For example, EPS1 is preset to be equal to 0.2. The closer to "1" a value of the EPS1 is set, the looser the judgement of the judging part 106 on existence or not of the cyclicity related to time change of the model predictive is. In addition, the EPS1 can also be set by a user in a range of "0" to "1".

That is, in the controller 10, the judging part 106 judges whether the cyclicity exists specific to the time change of the model predictive error based on a difference between an interval of the moments of the maximums respectively detected by the extremum detecting part 105 and an interval of the moments of the minimums respectively detected by the extremum detecting part 105.

According to the structure, the judging part 106 judges whether the cyclicity exists specific to the time change of the model predictive error based on a difference between the interval of the moments of the maximums respectively detected by the extremum detecting part 105 and the interval of the moments of the minimums respectively detected by the extremum detecting part 105.

Therefore, the controller 10 achieves the following effects of judging whether the cyclicity exists specific to the time change of the model predictive error based on a difference between the interval of the moments of the maximums respectively detected by the extremum detecting part and the interval of the moments of the minimums respectively detected by the extremum detecting part, and of correcting the predictive value of the controlled quantity predicted by using the model in the certain predictive error variation cycle by using the model in the certain predictive error variation cycle by using the model predictive error in a predictive error variation cycle prior to the certain predictive error variation cycle when the cyclicity is judged to exist.

For example, the judging part 106 judges that the cyclicity exists specific to the time change of the model predictive error when a difference between the interval of the moments of the maximums respectively detected by the extremum detecting part 105 and the interval of the moments of the minimums respectively detected by the extremum detecting part 105 is smaller than a prescribed value (the EPS1 mentioned above).

Therefore, the controller 10 achieves the following effects of judging that the cyclicity exists specific to the time change of the model predictive error when a difference between the interval of the moments of the maximums respectively detected by the extremum detecting part and the interval of the moments of the minimums respectively detected by the extremum detecting part is smaller than a prescribed value, and of correcting the predictive value of the controlled quantity predicted by using the model in the certain predictive error variation cycle by using the model in the certain predictive error variation cycle by using the model predictive error in a predictive error variation cycle prior to the certain predictive error variation cycle.

In addition, as mentioned above, the EPS1 can also be set by a user in a range of "0" to "1", The closer to "1" a value of the EPS1 is set, the looser the judgement of the judging part 106 on existence or not of the cyclicity related to time change of the model predictive is.

Besides, the example is explained as follows, that is, the judging part 106 divides $$|\{Ptime(k)-Ptime(k-2)\}-\{Ptime(k-1)-Ptime(k-3))\}| \quad \text{[Number 11]}$$

by $$|Ptime(k-1)-Ptime(k-3)|, \quad \text{[Number 12]}$$

Therefore, whether the cyclicity is judged specific to the time change of the model predictive error.

However, in the aspect that the judging part 106 judges whether the time change of the model predictive error has cyclicity, it is unnecessary to divide $$|\{Ptime(k)-Ptime(k-2)\}-\{Ptime(k-1)-Ptime(k-3))\}| \quad \text{[number 13]}$$

by $$|Ptime(k-1)-Ptime(k-3)|. \quad \text{[number 14]}$$

The judging part 106 only needs to judge whether the cyclicity exists specific to the time change of the model predictive error based on a difference between the interval of the moments of the maximums respectively detected by the extremum detecting part 105 and the interval of the moments of the minimums respectively detected by the extremum detecting part 105. That is, the judging part 106 can also judge, when $$|\{Ptime(k)-Ptime(k-2)\}-\{Ptime(k-1)-Ptime(k-3))\}|$$
is smaller than $EPS1$ (that is, close to "0"), that the time change of the model predictive error has cyclicity. [number 15]

Further, in the example, the extremum detecting part 105 respectively detects two maximums and minimums respective from the predictive error variation waveform (a curve causing the model predictive error to be arrayed along a time sequence), the judging part 106 judges whether the cyclicity exists specific to the time change of the model predictive error based on the interval between moments of the two maximums respectively detected and the interval between moments of the two minimums respectively detected.

However, the extremum detecting part 105 can also detect three extremums in the predictive error variation waveform, and the judging part 106 solves the interval of the moments of two adjacent extremums respectively detected and judges whether cyclicity exists specific to the time change of the model predictive error based on the difference between the initial interval and the next interval. That is, the judging part 106 judges whether cyclicity exists specific to the time change of the model predictive error based on the interval (initial interval) between the moment of the first extremum (for example maximum) and the moment of the detected second extremum (for example minimum) and the interval (next interval) between the moment of the detected second extremum (for example minimum) and the moment of the detected third extremum (for example maximum).

Besides, in the extremum detection in FIG. 5, in order to prevent misdetection caused by measured noise, besides, misdetection is performed in order to prevent microvibration under the stop state caused by static friction, the extremum detecting part 105 can also determine an extremum when a difference between the maximum and the minimum exceeds certain threshold. That is, in the controller 10, the extremum detecting part 105 only detects the maximums and the minimums of which the difference is larger than the prescribed value in the maximums and the minimums of the model predictive error in the time change of the continuous model predictive errors.

According to the structure, the extremum detecting part 105 only detects the maximums and the minimums of which the difference is larger than the prescribed value in the maximums and the minimums of the model predictive error in the time change of the continuous model predictive errors.

Herein, the model predictive error is computed by the error computing part 104 as an error between the actually measured value of the controlled quantity of the controlled object 30 and the predictive value of the controlled quantity predicted by using the model, and the actually measured value may contain a measured noise. Besides, for example, the actually measured value may be affected by tiny vibration under a stop state caused by static friction. That is, the model predictive error computed by the error computing part 104 may be affected by the measured noise that may be contained by the actually measured value.

The extremum detecting part 105 only detects the maximums and the minimums of which the difference is larger than the prescribed value in the maximums and the minimums of the model predictive error in the time change of the continuous model predictive errors, therefore, the model predictive error affected by the measured noise can be prevented from being mis-detected into the extremum (maximums and minimums).

Therefore, the controller 10 achieves the following effect of judging whether the cyclicity exists specific to the time change of the model predictive error by using a detecting moment of the extremum detected with a high precision.

(Correcting Method of Predictive Value—the Predictive Error Prior to One Cycle is Used for Prediction Correction)

Figure 6:
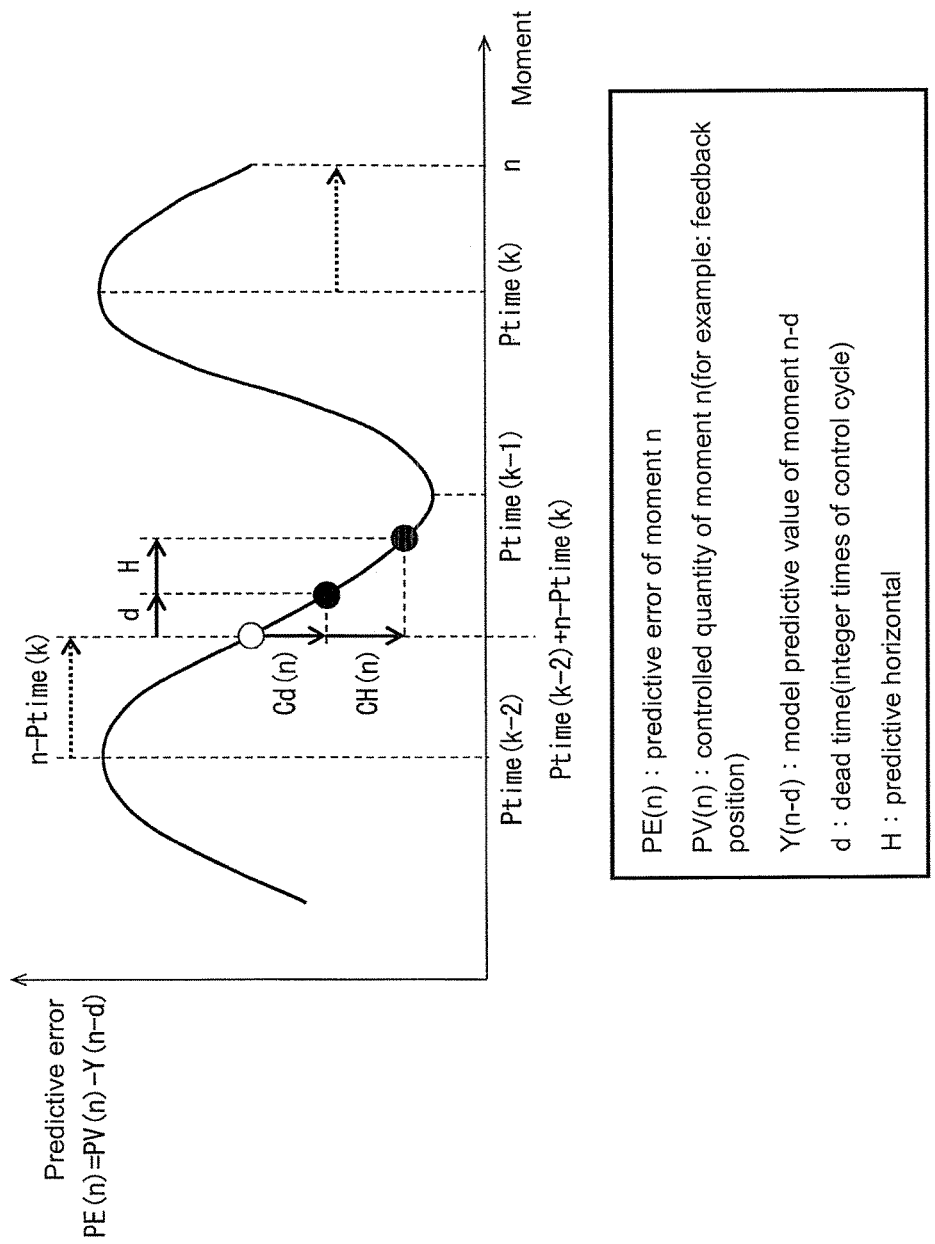
FIG. 6 is a diagram illustrating a method that the controller in FIG. 1 corrects a predictive value.

FIG. 6 is a diagram illustrating a method that the controller 10 corrects a predictive value. When the judging part 106 judges that there is cyclicity specific to the time change of the model predictive error, the predictive value correcting part 107 computes a predictive correcting quantity by the method as follows.

The predictive value correcting part 107 solves passing time from the finally determined extremum moment to the current moment, i.e., the passing time "n-Ptime(k)" at the moment n time point.

The predictive value correcting part 107 then uses the following formula to solve the moment prior to the current moment by one cycle as a predictive start point. That is, $$Ptime(k-2)+n-Ptime(k)$$

Then, the predictive value correcting part 107 solves a variation of the predictive error in the d interval of the dead time and in a predictive horizontal H interval starting from the moment solved according to the above formula as predictive correcting quantities Cd(n) and Ch(n). That is, $$Cd(n)=PE(Ptime(k-2)+n-Ptime(k)+d)-PE(Ptime(k-2)+n-Ptime(k)),$$

$$CH(n)=PE(Ptime(k-2)+n-Ptime(k)+d+H)-PE(Ptime(k-2)+n-Ptime(k)+d)$$ [Number 16]

In addition, as mentioned above, "PE(n)" is "predictive error at moment n", the error computing part 104 computes a model predictive error PE(n) through the following formula, and stores the computed model predictive error PE(n) as error data 1101 into the memory part 110.

$$PE(n)=PV(n)-Y(n-d)$$

(Verification of Disturbance Compensation Effect)

The controller 10 judges whether cyclicity exists specific to the time change of the error, i.e., model predictive error, between the actually measured value of the controlled quantity of the controlled object 30 and the predictive value of the controlled quantity predicted by using the model of the controlled object 30 (and the servo driver 20). Besides, the controller 10 corrects a predictive value of the controlled quantity predicted by using the model in a certain predictive error variation cycle by using the model predictive error in a predictive error variation cycle prior to the certain predictive error variation cycle for the predictive error variation cycle when it is judged that the cyclicity exists specific to the time change of the model predictive error. Regarding the effect that the disturbance compensation processing executed by the controller, "simple (common) disturbance" and "complex disturbance" are respectively explained.

The "simple (common) disturbance" means that the variation waveform expressing the time change of the size (predictive error variation waveform) only has disturbance of one cycle. Besides, the so-called "complex disturbance" means that the variation waveform expressing the time change of the size (predictive error variation waveform) has disturbance of a plurality of cycles.

(Compensation of Simple Disturbance)

Figure 7:
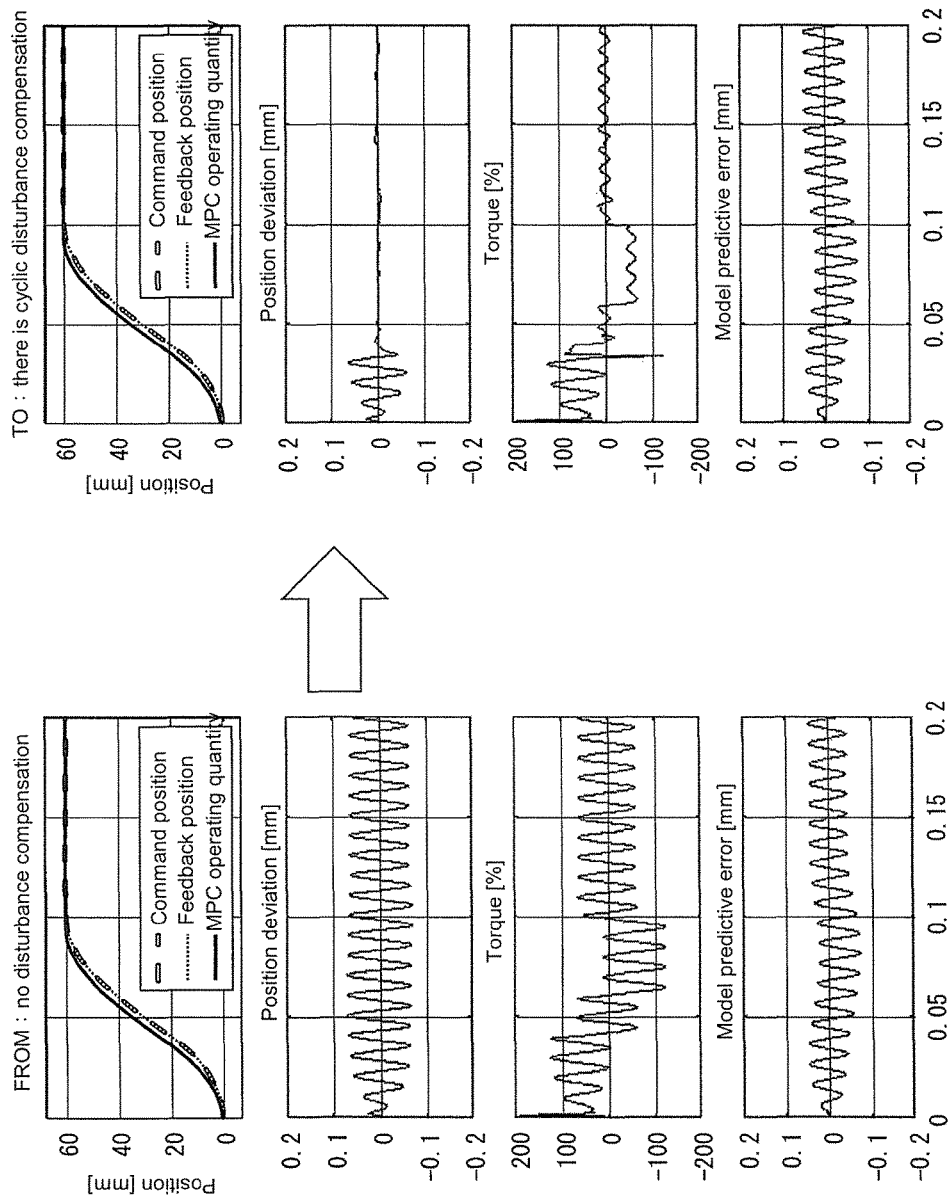
FIG. 7 is a diagram used for illustrating an effect when the controller in FIG. 1 executes disturbance compensation processing.

FIG. 7 is a diagram used for illustrating an effect when the controller 10 executes disturbance compensation processing. That is, the example as shown in FIG. 7 illustrates a diagram used for explaining an effect that under a condition of applying sine wave disturbance of "maximal amplitude of 10% and frequency of 100 Hz" specific to the control over target trajectory data (target trajectory) of "moving by 60 mm for 10 ms and then stopping for 100 ms", the controller 10 executes disturbance compensation processing.

As shown in FIG. 7, nearby the moment 40 ms, the controller 10 executes the cyclic disturbance compensation function, and a position deviation after the moment 40 ms can be inhibited to be smaller. That is, after the moment 40 ms, the influence of the influence on the control is inhibited. For example, the position deviation after the moment 40 ms is different from that before the moment 40 ms and is shifted by almost "0". The torque after the moment 40 ms is changed stably compared with that before the moment 40 ms, and is not greatly fluctuated like that before the moment 40 ms. That is, when judging that whether cyclicity exists, regarding the cycle of the disturbance (i.e., predictive error variation cycle), the controller 10 corrects the predictive value of the controlled quantity predicted at current (current moment) by using the model predictive error computed prior to the current (past), thereby inhibiting the influence of the disturbance on control.

Herein, in the method for judging the cyclicity of disturbance by using at least one of the position deviation and a vibration waveform of the position, when the disturbance compensation plays a role, correct judgment on the cyclicity cannot be performed. This is because through disturbance compensation, the disturbance is compensated, that is, the position deviation and vibration waveform of the position will be deformed due to disturbance compensation, and thus the disturbance (cyclicity of the disturbance) cannot be mastered correctly.

Relatively, in the controller 10, even during the cycle that the controller 10 inhibits the vibration of the position deviation through disturbance compensation, the vibration waveform of the disturbance is still residual in the predictive error. Therefore, the controller 10 can continuously compensate the disturbance. The controller 10 achieves the following effect: since the predictive error is used to judge disturbance cyclicity, even though the disturbance compensation is executed, the vibration waveform of the disturbance can still be detected in the predictive error and therefore, the controller 10 can correctly judge the cyclicity of the disturbance.

(Compensation of Complex Disturbance)

In the example as shown in FIG. 7, the controller 10 compensates the "simple (common) disturbance" that the predictive error variation waveform only has one cycle. Relatively, when the "complex disturbance" that the predictive error variation waveform has multiple cycles is compensated, the controller 10 can correctly master the cycle, i.e., predictive error variation cycle, of the time change of the model predictive errors by using a cycle lower limit (value). Hereinafter, FIGS. 8 and 9 are used for explanation.

Figure 8:
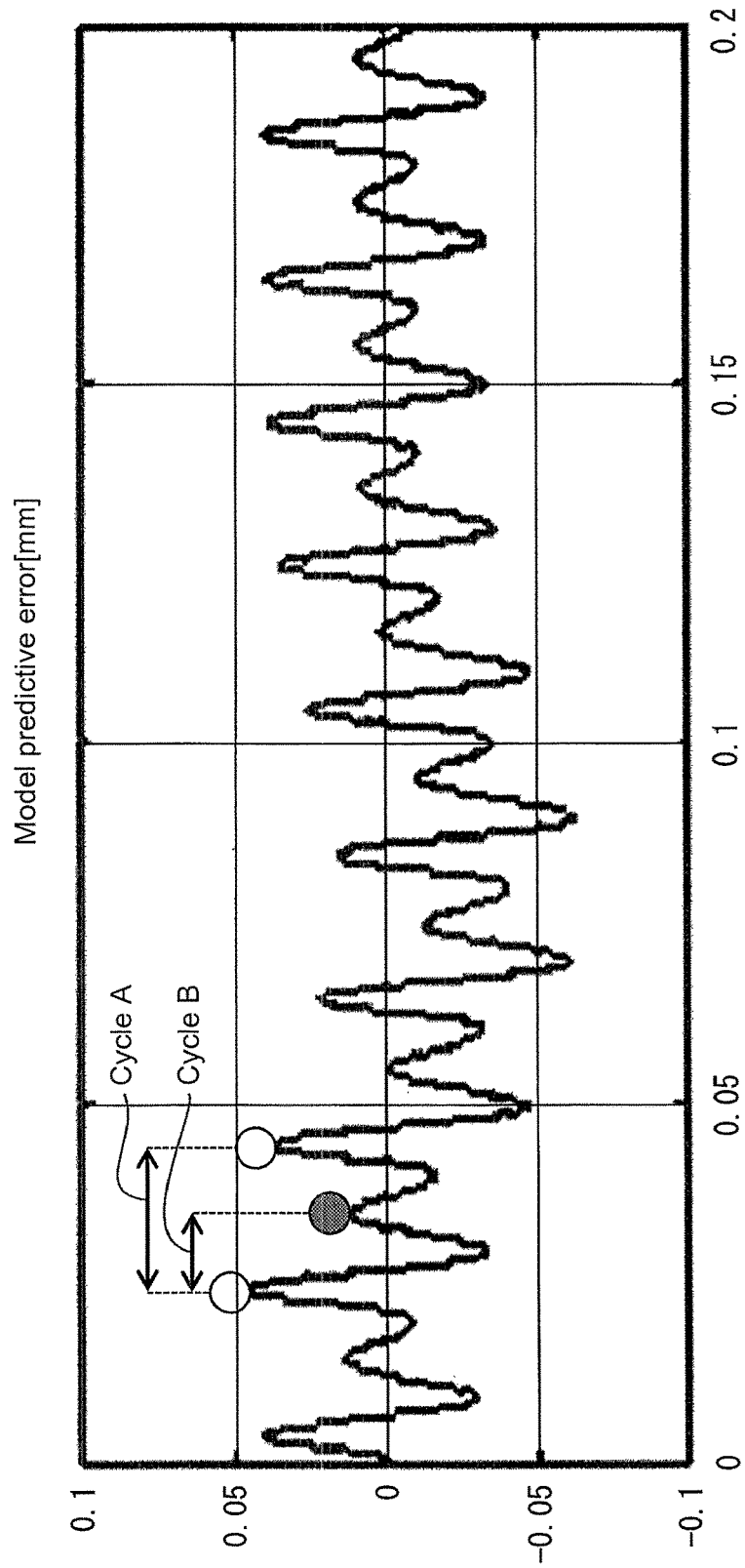
FIG. 8 is a diagram used for illustrating that the controller in FIG. 1 uses a cycle lower limit value to judge whether model predictive error has a cyclic complex disturbance.
Figure 9:
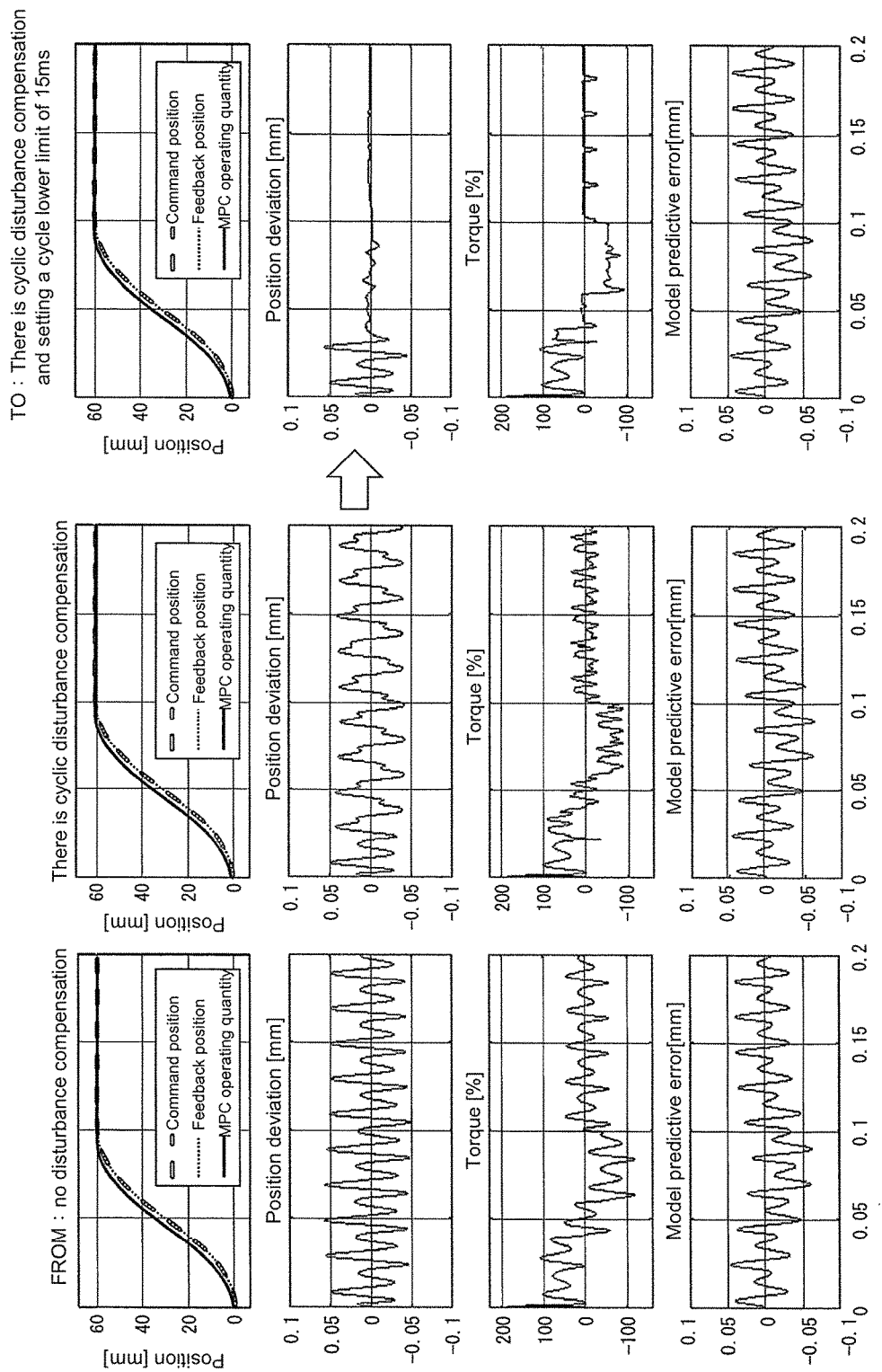
FIG. 9 is a diagram for illustrating an effect when the controller in FIG. 1 executes the disturbance compensation processing by using the cycle lower limit value.

FIG. 8 is a diagram used for illustrating that the controller 10 uses a cycle lower limit value to judge whether model predictive error has a cyclic "complex disturbance". The variation waveform (predictive error variation waveform) of the "simple (common) disturbance" as illustrated in FIG. 7 has a single cycle, relatively, the variation waveform (predictive error variation waveform) of the "complex disturbance" as illustrated in FIG. 8 has multiple cycles.

In FIG. 8, the cycle (A) is required to be captured, and cycle (B) must be omitted. Therefore, by setting the time longer than the cycle (B) and shorter than the cycle (A) to be the cycle lower limit value, in the controller 10, the judging part 106 can omit the cycle (B). For example, when the extremum detecting part 105 determines at least one of the maximum and the minimum n the time change of the model predictive error from the predictive error variation waveform, it can also be considered in a manner: the maximum (minimum), a time difference between which and the maximum (minimum) determined previously does not meet a cycle lower limit value, is not the maximum (minimum). That is, the cycle lower limit value is set, when the extremum detecting part 105 detects that the difference between the detecting moments of the maximums (minimums) is shorter than the cycle lower limit value, the extremum is not determined (i.e., not considered as the maximum (minimum)). The extremum detecting part 105 respectively detects the maximums in a manner that an interval between the detecting moments of the maximums is longer than a prescribed cycle, and (2) respectively detects the minimums in a manner that an interval between the detecting moments of the minimums is longer than a prescribed cycle.

The judging part 106 judges whether time change of the model predictive error has cyclicity by using multiple maximums of which the difference of the detecting moments is larger than the cycle lower limit value (to be more accurately speaking, using the interval of the detecting moments of the multiple maximums (minimums)).

Besides, the extremum detecting part 105 which uses the cycle lower limit value to detect (determine) the improvement of the extremum precision can be replaced with the judging part 106 which uses the cycle lower limit value to improve a precision for judging whether time change of the model predictive error has cyclicity. That is, the judging part 106 (1) uses the interval longer than the cycle lower limit value in the intervals between the detecting moments of the maximums as the interval used for judging whether the cyclicity exists and detecting the intervals of the moments of the maximums when the extremum detecting part 105 detects a plurality of maximums, and (2) uses the interval longer than the cycle lower limit value in the intervals between the detecting moments of the minimums as the interval used for judging whether the cyclicity exists and detecting the intervals of the moments of the minimums when the extremum detecting part 105 detects a plurality of minimums.

The cycle lower limit value is used by at least one of the judging part 106 and the extremum detecting part 105, such that in the predictive error variation waveform as illustrated in FIG. 8, the judging part 106 judges whether cyclicity exists specific to the time change of the model predictive error regarding cycle (A) instead of cycle (B). Besides, the predictive value correcting part 107 corrects a predictive value of the controlled quantity predicted by using the model in a certain predictive error variation cycle by using the model predictive error in a predictive error variation cycle prior to the certain predictive error variation cycle when the judging part 106 judges that the cyclicity exists specific to the time change of the model predictive error, wherein a cycle of the time change of the model predictive error is the predictive error variation cycle (i.e., cycle (A)).

Next, the effect that the controller 10 as mentioned above uses the cycle lower limit value to compensate the "complex disturbance" having multiple cycles of the predictive error variation waveform is explained by using FIG. 9.

FIG. 9 is a diagram for illustrating an effect when the controller 10 executes the disturbance compensation processing by using the cycle lower limit value. That is, FIG. 9 illustrates a diagram used for explaining an effect that under a condition of applying the "complex disturbance" as shown in the predictive error variation waveform having multiple cycles specific to the control over target trajectory data (target trajectory) of "moving by 60 mm for 10 ms and then stopping for 100 ms", the controller 10 executes disturbance compensation processing.

The processing executed by controller is compared with the condition as shown in FIG. 7, under the condition as shown in FIG. 9, only the cycle lower limit value is used. That is, under the condition as shown in FIG. 9, the controller 10 (extremum detecting part 105) executes the following processing: only the processing that "the extremum is not determined in the time that the cycle lower limit value is not met" is added to the processing under the condition as shown in FIG. 7.

In the model predictive error as illustrated by the difference lower section of FIG. 9, the predictive error variation waveform has multiple cycles. As illustrated in FIG. 8, when the predictive error variation cycle has multiple cycles, the longest cycle must be detected.

In the controller 10, a precision of the extremum detected (determined) by using the extremum detecting part 105 is improved. That is, the controller 10 presets the lower limit value of the cycle (cycle lower limit value), and by omitting the cycle not meeting the lower limit value, the predictive error variation of the longest cycle is detected.

A column in the center of FIG. 9 expresses a trajectory of the position deviation and the torque when the controller 10 executes general disturbance compensation (that is, the disturbance compensation processing not using the "cycle lower limit") specific to the "complex disturbance" having multiple cycles of the predictive error variation waveform.

As illustrated in FIG. 8, for the "complex disturbance" having multiple cycles of the predictive error variation waveform, the cyclicity is hard to correctly judge specific to the time change of the model predictive error, besides, it is hard to correctly infer the cycle of the time change of the model predictive error.

Therefore, specific to the "complex disturbance", the trajectory of the position deviation and torque when the controller 10 executes the disturbance compensation processing "without using the cycle lower limit value" is as shown by the column in the center of the FIG. 9, and is similar to the trajectory of the position deviation and the torque when the disturbance compensation processing is not executed (the column at the left side of FIG. 9 expresses the trajectory of the position deviation and the torque). That is, the controller 10 cannot inhibit the fluctuation caused by "complex disturbance" when not using the "cycle lower limit value", for example, the position deviation variation cannot be inhibited.

Relatively, as shown by the column at the right of FIG. 9, specific to the "complex disturbance" having multiple cycles of the predictive error variation waveform, the controller 10 can better inhibit position deviation variation by executing the disturbance compensation processing using the lower limit value. Besides, for a change of the torque, the torque can be stabilized.

That is, the controller can accurately judge whether the cyclicity related to time change exists specific to the "complex disturbance" having multiple cycles of the predictive error variation waveform by using the cycle lower limit value, and can correctly infer a cycle of the time change of the "complex disturbance" (that is, the cycle of the time change of the model predictive error). Besides, when judging that the disturbance has cyclicity, the controller 10 corrects the predictive value of the current controlled quantity (current moment) by using the model prediction error computed prior to (past) the current specific to the cycle of the disturbance (i.e., the predictive error variation cycle), thereby inhibiting an influence of the disturbance on control.

That is, in the controller 10, the extremum detecting part 105 (1) respectively detects the maximums in a manner that an interval between the detecting moments of the maximums is longer than a prescribed cycle, and (2) respectively detects the minimums in a manner that an interval between the detecting moments of the minimums is longer than a prescribed cycle.

According to the structure, the extremum detecting part 105 respectively detects the maximums (minimums) in a manner that an interval between the detecting moments of the maximums (minimums) is longer than a prescribed cycle. That is, the extremum detecting part 105 cannot determine the extremum (that is, not considered as the maximum and (minimum)) when the difference (interval) between the detecting moments of the maximums (minimums) is shorter than a prescribed cycle. The extremum detecting part 105 for example can also be considered in a manner: a peak (valley), a difference between which and the detecting moment of the maximum (minimum) determined previously does not meet the prescribed value, is not the maximum (minimum).

Herein, for example, when a curve expressing a time change of the model predictive error is a large cycle curve containing small cycle curves, the cycle used when the cyclicity of the time change of the model predictive error is judged is the cycle of the large cycle curve.

Therefore, the controller 10 achieves the following effects of correctly judging whether the cyclicity exists specific to the time change of the model predictive error since the detected interval of the moments of the extremums (maximum or minimum) longer than the interval of the prescribed cycle is used for judging whether the cyclicity exists.

(Improvement of the Judging Precision of the Cyclicity of the Cycle Lower Limit Value Designated by the User)

In addition, the cycle lower limit value when the judging part 106 judges whether cyclicity exists specific to the time change of the model predictive error can also be a value designated by the user. That is, the receiving part 108 of the controller 10 accepts a user operation of designating the cycle lower limit value. That is, the receiving part 108 of the controller 10 accepts the user operation designating the cycle lower limit value. Besides, the judging part 106 (1) uses the interval longer than the cycle lower limit value in the intervals between the detecting moments of the maximums as the interval used for judging whether the cyclicity exists and detecting the intervals of the moments of the maximums when the extremum detecting part 105 detects a plurality of maximums, and (2) uses the interval longer than the cycle lower limit value in the intervals between the detecting moments of the minimums as the interval used for judging whether the cyclicity exists and detecting the intervals of the moments of the minimums when the extremum detecting part 105 detects a plurality of minimums.

According to the structure, the judging part 106 (1) uses the interval longer than the cycle lower limit value in the intervals between the detecting moments of the maximums as the interval used for judging whether the cyclicity exists and detecting the intervals of the moments of the maximums when the extremum detecting part 105 detects a plurality of maximums, and (2) uses the interval longer than the cycle lower limit value in the intervals between the detecting moments of the minimums as the interval used for judging whether the cyclicity exists and detecting the intervals of the moments of the minimums when the extremum detecting part 105 detects a plurality of minimums.

Herein, for example, when the curve expressing the time change of the model predictive error is the large cycle curve containing small cycle curves, the cycle used when the cyclicity of the time change of the model predictive error is judged is the cycle of the large cycle curve.

Therefore, the controller 10 achieves the following effects of correctly judging whether the cyclicity exists specific to the time change of the model predictive error since the detected interval of the moments of the extremums (maximum or minimum) longer than the interval of the prescribed cycle is used for judging whether the cyclicity exists.

(An Example of a Display Picture)

Figure 10:
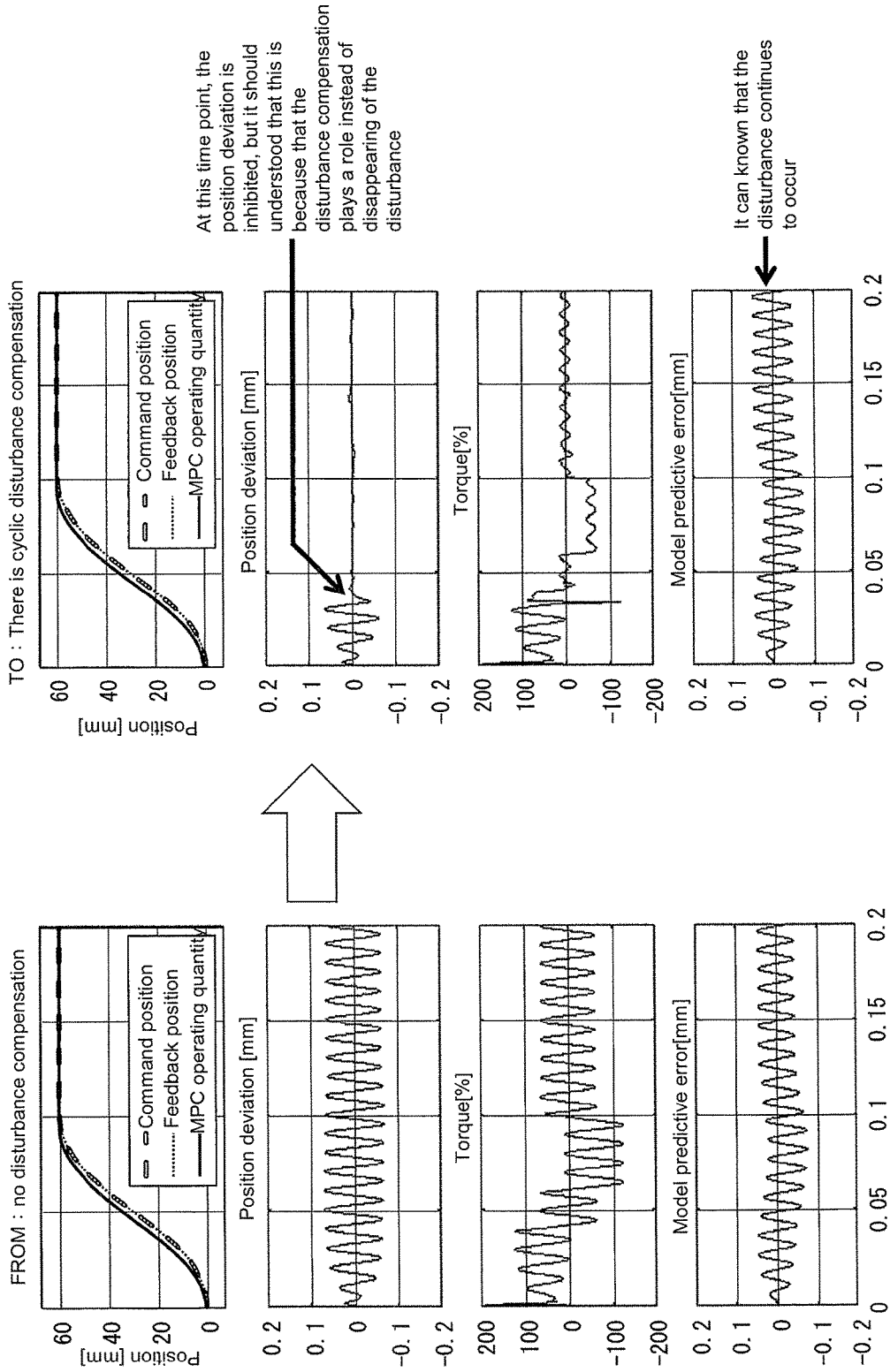
FIG. 10 is a diagram for illustrating an example of a trend graph of a predictive error displayed by the controller in FIG. 1.

FIG. 10 a diagram for illustrating an example of a trend graph of a predictive error displayed by the controller 10. As shown in FIG. 10, a display control part 109 of the controller 10 displays the time change of the model predictive error (the error data 1101 computed and stored into the memory part 110 by the error computing part 104) to a user.

According to the structure, the display control part 109 displays the time change of the model predictive error to the user. Therefore, the controller 10 achieves the following effect that since the time change of the model predictive error is displayed to the user, the user can approximately master a disturbance form according to a waveform occurring in the time change (so-called trend graph) of the model predictive error displayed by the controller 10.

The display control part 109 displays a trend graph of the predictive error (model predictive error), such that the user can confirm a generating moment of the disturbance and how the generated disturbance is changed. Particularly, when the disturbance compensation effectively plays a role, the user difficulty conforms a form of the generated disturbance only depending on control over fluctuation of the deviation (for example position deviation). Since the display control part 109 displays a trend graph of the predictive error, the user can easily confirm a generating time point (moment) of the disturbance and the time change of the disturbance.

Figure 11A:
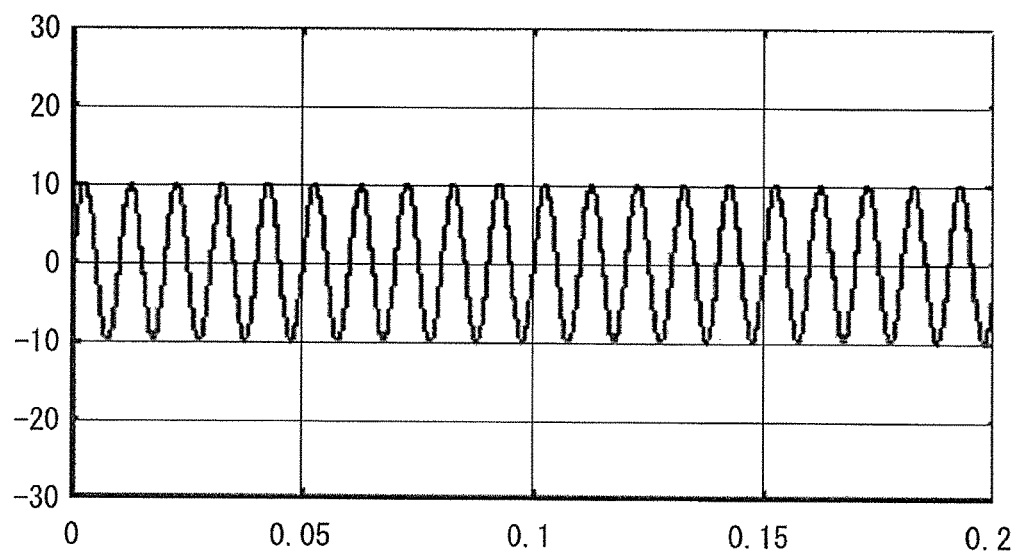
FIGS. 11(A) and 11(B) are diagrams illustrating a torque disturbance waveform compensated by the controller in FIG. 1.
Figure 11B:
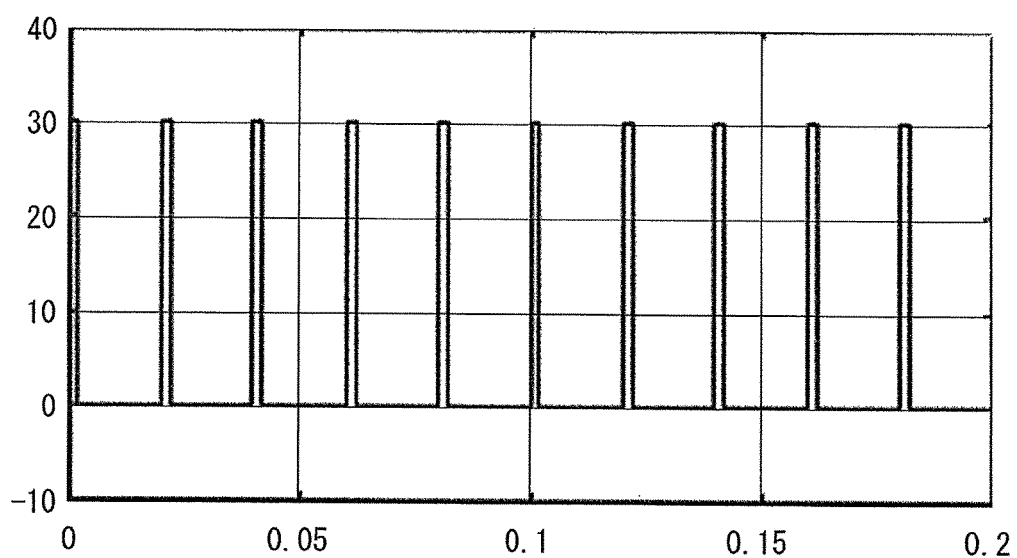

FIGS. 11(A) and 11(B) are diagrams illustrating a torque disturbance waveform compensated by the controller 10. In addition, FIG. 11(A) illustrates that in the example as shown in FIG. 7, the controller 10 executes torque disturbance waveform of the disturbance compensation processing (the "simple (common) disturbance as shown by the predictive error variation waveform of single cycles"). Besides, FIG. 11(B) illustrates that in the example as shown in FIG. 9, the controller 10 executes the torque disturbance waveform ("complex disturbance" as shown by the predictive error variation waveform of multiple cycles) of the disturbance compensation processing.

Embodiment 2

Figure 12:
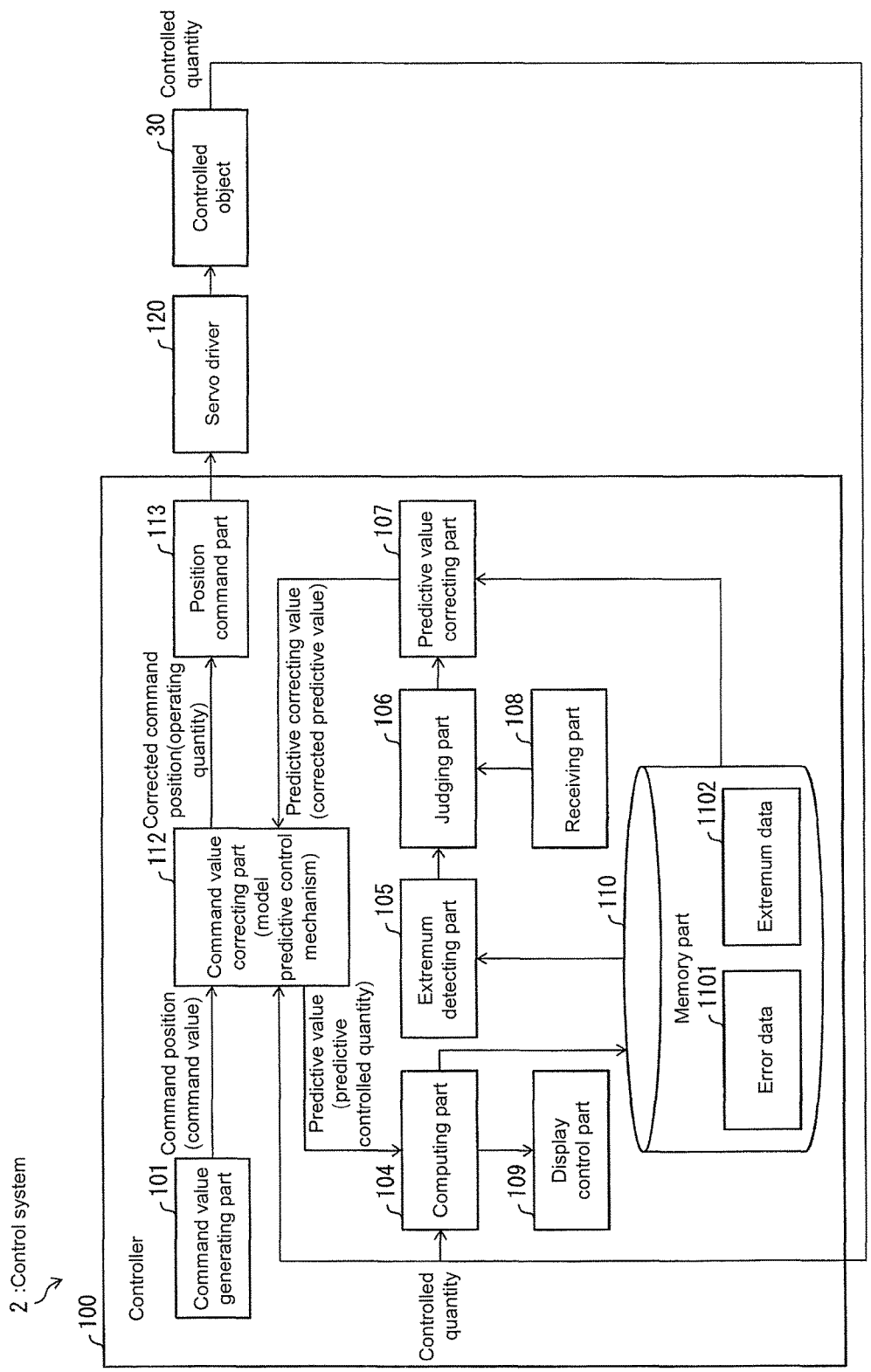
FIG. 12 is a block diagram of a main part structure of a controller of an embodiment 2 of the present invention.
Figure 13:
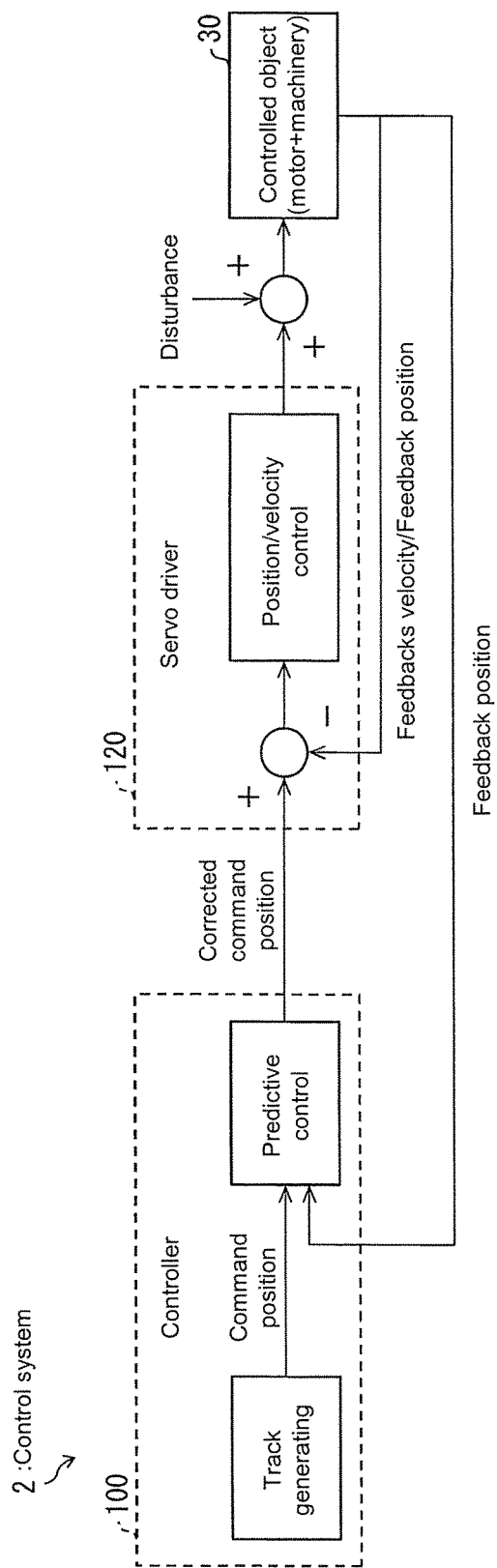
FIG. 13 is a diagram illustrating a summary of a control system containing the controller in FIG. 12.

Another embodiment of the present invention is explained based on FIGS. 12 and 13. In addition, in order to ensure compactness in recording, only the structures (processing process and processed content) different from embodiment 1 are explained. That is, the structures recorded in embodiment 1 can all be contained in the present embodiment. Besides, the meanings of terms recorded in embodiment 1 also the same as those in embodiment 2.

(Summary of a Control System)

FIG. 13 is a diagram illustrating a summary of a control system 2 containing a controller 100. The control system 2 is different from the control system 1 that executes position/velocity control and outputs the torque command value through predictive control to the servo driver 20 through the controller 10, the controller 100 corrects a command position for a servo driver 120 through predictive control and the servo driver 120 executes position/velocity control. That is, in the control system 1, the controller 10 outputs the torque command value to the servo driver 20, relatively, in the control system 2, the controller 100 output the command position to the servo driver 120.

The controller 100 is a controller having a model predictive control mechanism and outputs the command position as an operating quantity to the servo driver 120. The controller 100 for example accepts target trajectory data (target trajectory) (trajectory generation) from outside such as a user, and generates a command value (command position) in each control cycle according to the accepted target trajectory data. Besides, the controller 100 obtains "output, i.e., controlled quantity (predictive value of the controlled quantity), of the controlled object 30" from the controlled object 30 as feedback information. That is, the controller 100 obtains the position output from the controlled object 30 as a feedback position.

Herein, the controller 100 has a model of the controlled object 30 as an internal model and, and by using the internal model, outputs the command position as the operating quantity to the servo driver 120 based on the generated position command and "the output, that is, the feedback position (actually measured value of the controller) of the controlled object 30". The internal model used by the controller 100 is the models of the servo driver 120 and the controlled object 30. In the control system 2, since the characteristics of the servo driver 120 cannot be omitted, it is not enough if there is only the model of the controlled object 30, and the controller 100 needs the models of the servo driver 120 and the controlled object 30 as the internal model.

The controller 100 predicts the controlled quantity output by the controlled object 30 by using the internal model, and infers a predictive error for disturbance compensation, that is, uses the prestored model predictive error (the model predictive error in the former predictive error variation cycle) to correct the predicted controlled quantity (predictive value). Besides, the controller 100 uses the predictive value, i.e., predictive corrected value (corrected predictive value), that is corrected by using the model predictive error to compute the corrected command position (operating quantity) output to the servo driver 120.

The servo driver 120 performs position/velocity control over the controlled object 30. That is, the servo driver 120 obtains the command position (corrected command position) from the controller 100. Besides, the servo driver 120 obtains the "output, i.e., the controlled quantity (actually measured value of the controlled quantity) of the controlled object 30" from the controlled object 30 as feedback information. That is, the servo driver 120 obtains the velocity and position (at least one of the velocity and position) output from the controlled object 30 as a feedback velocity and a feedback position (at least one of the feedback velocity and the feedback position).

The servo driver 120 uses at least one of the command position (corrected command position) obtained from the controller 100 and the feedback velocity and feedback position obtained from the controlled object 30 to execute position/velocity control over the controlled object 30.

(Summary of the Controller)

As so far, FIG. 13 is used to explain the controller 100 contained in the control system 1, and then the structure and processed content are explained with FIG. 12. Before detailed content is explained by referring to FIG. 12, the summary is cleared up as follows to conveniently understand the controller 100.

The controller 100 further comprises a command value correcting part 112, correcting the command value in a manner that the predictive value corrected by the predictive value correcting part 107 follows the command value; and a position command part 113, outputting the command value corrected by the command value correcting part 112, i.e., a corrected command value, as a command value related to position control of the controlled object 30 to the servo driver 120 (control system performing motion control over the controlled object 30).

According to the structure, the command value correcting part 112 corrects the command value in a manner that the predictive value corrected by the predictive value correcting part 107 follows the command value; and the position command part 113 outputs the command value corrected by the command value correcting part, i.e., a corrected command value, as a command value related to position control of the controlled object 30 to the servo driver 120.

Therefore, the controller 100 achieves the following effect of being capable of outputting the command value corrected in a manner that the controlled quantity of the controlled object 30 follows the command value to the servo driver 120.

(Details of the Controller)

For the controller 100 of which the summary is explained, its detailed structure is explained by using FIG. 12.

FIG. 12 is a block diagram of a main part structure of a controller 100 of the embodiment 2 of the present invention. The controller 100 as shown in FIG. 12 has a command value correcting part 112 and a position command part 113 instead of the torque computing part 102 and torque command part 103 of the controller 10 as shown in FIG. 1. Regarding the structures except for the torque computing part 102 and torque command part 103 of the controller 100, since the structures are same as the structures expect for the torque computing part 102 and torque command part 103 of the controller 10, its detailed recording is omitted.

The command value correcting part 112 executes model predictive control, specifically speaking, an internal model of the controlled object (that is, the servo driver 120 and the controlled object 30) is used to predict a future state to decide an operating quantity (command position) in a manner of controlling the future output (predictive value of the controlled quantity) of the controlled object 30 to approach to a target value (command value, that is the command position) as much as possible. That is, the command value correcting part 112 predicts a change of the future output (controlled quantity) based on the internal model, so as to decide the input (operating quantity, i.e., the command position) in a manner that the output is approached to the target value as much as possible.

The command value correcting part 112 contains the internal model for modelling actions of the controlled object (controlled object 30), and uses the internal model to predict a controlled quantity output by the controlled object 30 in each control cycle. That is, the command value correcting part 112 uses the internal model to compute the predictive value in each control cycle (predictive value of the controlled quantity). The torque computing part 112 notifies the error computing part 104 of the computed predictive value (predictive controlled quantity).

Besides, the command value correcting part 112 uses the internal model to compute the predictive corrected value (corrected predictive value) obtained from the predictive value correcting part 107, that is, the predictive value (predictive value of the controlled quantity) corrected by the predictive value correcting part 107 follows an operating quantity required by the command value (command position). The command value correcting part 112 notifies the position command part 113 of the computed torque as the corrected command position as the operating quantity.

The position command part 113 uses the corrected command position (operating quantity) notified from the command value correcting part 112 as a command value related to the position/velocity control of the controlled object 30 and outputs to the servo driver 120 (control system performing motion control over the controlled object 30).

(Implementing Examples by Means of Software)

Control blocks (particularly, the command value generating part 101, the torque computing part 102, the torque command part 103, the error computing part 104, the extremum detecting part 105, the judging part 106, the predictive value correcting part 107, the receiving part 108, the display control part 109, the command value correcting part 112 and the position command part 113) of the controller 10 and the controller 100 can be realized by a logic circuit (hardware) formed on an IC chip and can also be realized by software by using a Central Processing Unit (CPU).

Under the latter condition, the controller 10 and the controller 100 have a CPU executing a command for realizing software of various functions, i.e., a program; a Read Only Memory (ROM) or storage device (they are called as "recording medium"), recording the program and various data in a computer (or CPU)-readable manner; and a Random Access Memory (RAM) expanding the program. Besides, the objective of the present invention is finished by reading the program from the recording medium and executing the program through the computer (CPU). As the recording medium, "a non-temporary physical medium", for example, a tape, a disk, a card, a semiconductor memory, a programmable logic circuit, etc., can be used. Besides, the program can be provided to the computer through any transfer medium (communication network or radio waves) capable of transmitting the program. In addition, the present invention can be realized by embodying the program through electronic transfer in a form of a data signal embedded into carriers.

The present invention is not limited to each embodiment, and can be changed in many ways in the scope shown by claims, and the embodiments obtained by properly combining the technical means respectively disclosed in different embodiments also fall within a technical scope of the present invention.

What is claimed is:

1. A model predictive control device, using a model of a controlled object to predict a controlled quantity of the controlled object corresponding to a command value generated in each control cycle according to a target trajectory and characterized by comprising:

a controller configured to judge whether cyclicity exists specific to a time change of a model predictive error, wherein the model predictive error is an error between an actually measured value of the controlled quantity of the controlled object and a predictive value of the controlled quantity predicted by using the model;

correct the predictive value of the controlled quantity predicted by using the model in a certain predictive error variation cycle by using the model predictive error in a predictive error variation cycle prior to the certain predictive error variation cycle when the controller judges that the cyclicity exists specific to the time change of the model predictive error, wherein a cycle of the time change of the model predictive error is the predictive error variation cycle;

adjust the controlled quantity of the controlled object according to the corrected predictive value;

respectively computing continuous model predictive errors specific to a plurality of continuous control cycles; and detecting a maximum and a minimum of the model predictive error according to a time change of the continuous model predictive errors respectively, wherein the controller judges whether the cyclicity exists specific to the time change of the model predictive errors from the maximum and the minimum respectively detected by the controller, the controller only detects maximums and minimums of which a difference is larger than a prescribed value in maximums and minimums of the model predictive error in the time change of the continuous model predictive errors.

2. The model predictive control device according to claim 1, characterized in that
the controller judges whether the cyclicity exists specific to the time change of the model predictive error based on a difference between an interval of moments of maximums respectively detected by the controller and an interval of moments of minimums respectively detected by the controller.

3. The model predictive control device according to claim 2, characterized in that
the controller respectively detects the maximums in a manner that an interval between detecting moments of the maximums is longer than a prescribed cycle, and
respectively detects the minimums in a manner that an interval between detecting moments of the minimums is longer than a prescribed cycle.

4. The model predictive control device according to claim 2, characterized in that the controller further
accepting a user operation of a cycle lower limit value designated, and
using an interval longer than the cycle lower limit value in intervals between detecting moments of the maximums as an interval used for judging whether the cyclicity exists and detecting intervals of moments of the maximums when the controller detects a plurality of maximums, and
uses an interval longer than the cycle lower limit value in the intervals between detecting moments of the minimums as an interval used for judging whether the cyclicity exists and detecting intervals of moments of the minimums when the controller detects a plurality of minimums.

5. The model predictive control device according to claim 1, characterized in that the controller further
displaying the time change of the model predictive error to a user.

6. The model predictive control device according to claim 1, characterized further
computing a torque required by the predictive value corrected by the controller to follow the command value; and
outputting the torque computed by the controller as a command value related to torque control of the controlled object to a control system performing motion control over the controlled object.

7. The model predictive control device according to claim 1, characterized in that the controller further
correcting the command value in a manner that the predictive value corrected by the controller follows the command value; and
outputting a corrected command value as a command value related to position control of the controlled object to a control system performing motion control over the controlled object, wherein the corrected command value is the command value corrected by the controller.

8. A control method, being a control method of a model predictive control device, wherein the model predictive control device uses a model of a controlled object to predict a controlled quantity of the controlled object corresponding to a command value generated in each control cycle according to a target trajectory, and the control method is characterized by comprising:
a judging step, judging whether cyclicity exists specific to a time change of a model predictive error, wherein the model predictive error is an error between an actually measured value of the controlled quantity of the controlled object and a predictive value of the controlled quantity predicted by using the model;
a predictive value correcting step, correcting the predictive value of the controlled quantity predicted by using the model in a certain predictive error variation cycle by using the model predictive error in a predictive error variation cycle prior to the certain predictive error variation cycle when the judging step judges that the cyclicity exists specific to the time change of the model predictive error, wherein a cycle of the time change of the model predictive error is the predictive error variation cycle;
adjust the controlled quantity of the controlled object according to the corrected predictive value;
respectively computing continuous model predictive errors specific to a plurality of continuous control cycles;
detecting a maximum and a minimum of the model predictive error according to a time change of the continuous model predictive errors respectively;
judging whether the cyclicity exists specific to the time change of the model predictive errors from the maximum and the minimum respectively detected; and
detecting only maximums and minimums of which a difference is larger than a prescribed value in maximums and minimums of the model predictive error in the time change of the continuous model predictive errors.

9. A computer readable recording medium comprising an information processing program and characterized in that the information processing program is for using a computer as a model predictive control device wherein the model predictive control device uses a model of a controlled object to predict a controlled quantity of the controlled object corresponding to a command value generated in each control cycle according to a target trajectory, and the model predictive control device comprises:
a controller configured to judge whether cyclicity exists specific to a time change of a model predictive error, wherein the model predictive error is an error between an actually measured value of the controlled quantity of the controlled object and a predictive value of the controlled quantity predicted by using the model;
correct the predictive value of the controlled quantity predicted by using the model in a certain predictive error variation cycle by using the model predictive error in a predictive error variation cycle prior to the certain predictive error variation cycle when the judging part judges that the cyclicity exists specific to the time change of the model predictive error, wherein a cycle of the time change of the model predictive error is the predictive error variation cycle;
adjust the controlled quantity of the controlled object according to the corrected predictive value;
respectively computing continuous model predictive errors specific to a plurality of continuous control cycles; and
detecting a maximum and a minimum of the model predictive error according to a time change of the continuous model predictive errors respectively,
wherein the controller judges whether the cyclicity exists specific to the time change of the model predictive errors from the maximum and the minimum respectively detected by the controller, the controller only detects maximums and minimums of which a difference is larger than a prescribed value in maximums and minimums of the model predictive error in the time change of the continuous model predictive errors.

* * * * *